United States Patent
Courtemanche et al.

(10) Patent No.: US 12,398,241 B2
(45) Date of Patent: Aug. 26, 2025

(54) COMPOSITION AND METHOD FOR REACTING AN ORGANOSILICON COMPOUND AND A SILYL HYDRIDE CATALYZED BY A FLUORINATED ARYLBORANE LEWIS ACID

(71) Applicants: Dow Silicones Corporation, Midland, MI (US); Dow Global Technologies LLC, Midland, MI (US)

(72) Inventors: Marc-Andre Courtemanche, Midland, MI (US); Anne-Catherine Bédard, Midland, MI (US); Heather Spinney, Midland, MI (US); David Wilson, Midland, MI (US); Arjun Raghuraman, Pearland, TX (US); Sukrit Mukhopadhyay, Midland, MI (US); Travis Sunderland, Midland, MI (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 433 days.

(21) Appl. No.: 17/916,834

(22) PCT Filed: Jun. 16, 2021

(86) PCT No.: PCT/US2021/037541
§ 371 (c)(1),
(2) Date: Oct. 4, 2022

(87) PCT Pub. No.: WO2021/262495
PCT Pub. Date: Dec. 30, 2021

(65) Prior Publication Data
US 2023/0151157 A1    May 18, 2023

Related U.S. Application Data

(60) Provisional application No. 63/043,153, filed on Jun. 24, 2020.

(51) Int. Cl.
*C08G 77/18* (2006.01)
*C08G 77/08* (2006.01)
*C08G 77/12* (2006.01)
*C08G 77/22* (2006.01)

(52) U.S. Cl.
CPC ............. *C08G 77/18* (2013.01); *C08G 77/08* (2013.01); *C08G 77/12* (2013.01); *C08G 77/22* (2013.01)

(58) Field of Classification Search
CPC ........ C08G 77/18; C08G 77/08; C08G 77/12; C08G 77/22
See application file for complete search history.

(56) References Cited

U.S. PATENT DOCUMENTS

| | | |
|---|---|---|
| 3,159,601 A | 12/1964 | Ashby et al. |
| 3,220,972 A | 11/1965 | Lamoreaux et al. |
| 3,296,291 A | 1/1967 | Scotia et al. |
| 3,419,593 A | 12/1968 | Willing et al. |
| 3,516,946 A | 6/1970 | Scotia et al. |
| 3,814,730 A | 6/1974 | Karstedt et al. |
| 3,989,668 A | 11/1976 | Lee et al. |
| 4,374,967 A | 2/1983 | Brown et al. |
| 4,766,176 A | 8/1988 | Lee et al. |
| 4,784,879 A | 11/1988 | Lee et al. |
| 5,017,654 A | 5/1991 | Togashi et al. |
| 5,036,117 A | 7/1991 | Chung et al. |
| 5,175,325 A | 12/1992 | Brown et al. |
| 5,625,023 A | 4/1997 | Chung et al. |
| 6,586,535 B1 | 7/2003 | Clark et al. |
| 6,624,254 B1 | 9/2003 | Arriola et al. |
| 6,806,339 B2 | 10/2004 | Cray et al. |
| 7,064,173 B2 | 6/2006 | Rubinsztajn et al. |
| 8,048,819 B2 | 11/2011 | Rubinsztajn et al. |
| 8,304,543 B2 | 11/2012 | Jialanella et al. |
| 8,722,153 B2 | 5/2014 | Ekeland |
| 8,933,177 B2 | 1/2015 | Hori et al. |
| 9,035,008 B2 | 5/2015 | Yang et al. |
| 9,156,948 B2 | 10/2015 | Brandstadt et al. |
| 9,593,209 B2 | 3/2017 | Dent et al. |
| 9,670,392 B2 | 6/2017 | Larson et al. |
| 11,133,504 B2 | 9/2021 | Kawakami et al. |
| 2003/0088042 A1 | 5/2003 | Griswold et al. |
| 2003/0139287 A1* | 7/2003 | Deforth ................ C08G 77/08 502/202 |

(Continued)

FOREIGN PATENT DOCUMENTS

| | | |
|---|---|---|
| EP | 0556023 A1 | 8/1993 |
| EP | 0347895 B | 11/1993 |

(Continued)

OTHER PUBLICATIONS

JP-2019218267-A_2019-12-26_ENGLISH Translation.*
Becke, "Density-functional thermochemistry. III. The role of exact exchange", J. Chem. Phys., 1993, 98, p. 5648.
Chojnowski, "Hydried Transfer Ring-Opening Polymerization of a Cyclic Oligomethylhydrosiloxane. Route to a Polymer of Closed Multicyclic Structure", Macromolecules 2012, vol. 45, pp. 2654-2661.
Chojnowski, "Mechanism of the B(C6F5)3-Catalyzed Reaction of Silyl Hydrides with Alkoxysilanes. Kinetic and Spectroscopic Studies", Organometallics, 2005, 24, pp. 6077-6084.

(Continued)

*Primary Examiner* — Michael L Leonard
(74) *Attorney, Agent, or Firm* — Catherine U. Brown

(57) ABSTRACT

A composition and method can be used in the preparation of various siloxanes. The composition and method employ a fluorinated triarylborane Lewis acid, a hydrocarbonoxy-functional organosilicon compound, and a silyl hydride. The fluorinated triarylborane Lewis acid catalyzes reaction of a hydrocarbonoxy moiety (from the organosilicon compound) and a silicon-bonded hydrogen atom (from the silyl hydride) to form a siloxane bond.

20 Claims, No Drawings

(56) References Cited

U.S. PATENT DOCUMENTS

| | | |
|---|---|---|
| 2004/0254274 A1 | 12/2004 | Griswold |
| 2005/0038188 A1 | 2/2005 | Ahn et al. |
| 2006/0241271 A1* | 10/2006 | Rubinsztajn .......... C07F 7/0874 528/33 |
| 2007/0289495 A1 | 12/2007 | Cray et al. |
| 2011/0287267 A1 | 11/2011 | Hori et al. |
| 2016/0053056 A1 | 2/2016 | Gould et al. |

FOREIGN PATENT DOCUMENTS

| | | |
|---|---|---|
| JP | 2019218267 A * | 12/2019 |
| WO | 0212386 A1 | 2/2002 |
| WO | 2013142956 A1 | 10/2013 |
| WO | 2019023008 A1 | 1/2019 |
| WO | 2019055740 A1 | 3/2019 |
| WO | 2019182986 A1 | 9/2019 |
| WO | 2019182993 A1 | 9/2019 |
| WO | 2020131365 A1 | 6/2020 |
| WO | WO-2020247334 A1 * | 12/2020 ............. C08G 77/06 |

OTHER PUBLICATIONS

Chojnowski, "Oligomerization of Hydrosiloxanes in the Presence of Tris(pentaflurophenyl)borane", Macromolecules, 2006, 39, pp. 3802-3807.

Ditchfield, "Self-Consistent Molecular-Orbital Methods. IX. An Extended Gaussian-Type Basis for Molecular-Orbital Studies of Organic Molecules", J. Chem. Phys., 1971, vol. 54, p. 724.

Fawcett, "Rapid, Metal-Free Room Temperature Vulcanization Produces Silicone Elastomers", Polym. Sci. A Polym. Chem., 2013, 51, pp. 644-652.

Gordon, "The Isomers of Silacyclopropane", Chem. Phys. Lett. 1980, vol. 76, p. 163.

Hehre, "Self-Consistent Molecular Orbital Methods. XII. Further Extensions of Gaussian-Type Basis Sets for Use in Molecular Orbital Studies of Organic Molecules", J. Chem. Phys., 1972, vol. 56, p. 2257.

Herrington, "Novel H2 activation by a tris[3,5-bis(trifluoromethyl)phenyl]borane frustrated Lewis pair", Dalton Trans., 2012, vol. 41, p. 9019.

Lee, C. et al., Phys. Rev B 1988, 37, 785.

Miehlich, "Results Obtained with the Correlation Energy Density Functionals of Becke and Lee, Yang and Parr", Chem. Phys. Lett., 1989, vol. 157, p. 200.

Piers, "Mechanistic Aspects of Bond Activation with Perfluoroarylboranes", Inorg. Chem., 2011, 50, pp. 12252-12262.

Poater, "SambVca: A Web Application for the Calculation of the Buried vol. N-Heterocyclic Carbene Ligands", Eur. J. Inorg. Chem., 2009, p. 1759.

Watson, "Colored indicators for simple direct titration of magnesium and lithium reagents", J. Organomet. Chem., 1967, vol. 9, pp. 165-168.

* cited by examiner

COMPOSITION AND METHOD FOR REACTING AN ORGANOSILICON COMPOUND AND A SILYL HYDRIDE CATALYZED BY A FLUORINATED ARYLBORANE LEWIS ACID

CROSS REFERENCE TO RELATED APPLICATIONS

This application is a U.S. national stage filing under 35 U.S.C. § 371 of PCT Application No. PCT/US21/037541 filed on 16 Jun. 2021, currently pending. which claims the benefit of U.S. Provisional Patent Application No. 63/043, 153 filed 24 Jun. 2020 under 35 U.S.C. § 119 (e). PCT Application No. PCT/US21/037541 and U.S. Provisional Patent Application No. 63/043,153 are each hereby incorporated by reference.

TECHNICAL FIELD

A composition includes a hydrocarbonoxy-functional organosilicon compound, a silyl hydride, and a fluorinated triarylborane Lewis acid. In the method, the fluorinated triarylborane Lewis acid catalyzes a reaction of a hydrocarbonoxy group from the organosilicon compound and silicon-bonded hydrogen atoms from the silyl hydride, thereby forming a siloxane bond in the resulting product.

BACKGROUND

The catalysts predominantly employed in the preparation of both siloxane intermediates and siloxane-cured networks from Si—H functional silanes and siloxanes are platinum-based catalysts. Due to the increasingly high cost of platinum (Pt) and other drawbacks such as yellowing of cured siloxane compositions or formation of a black precipitate over time, there is an industry need for an alternative to Pt-based catalysts. Furthermore, Pt-based catalysts may also suffer from the drawback of requiring high temperatures (80° C.-110° C.) to achieve sufficient reactivity to catalyze formation of siloxane bonds.

SUMMARY

A composition comprises: A) a fluorinated triarylborane Lewis acid, B) a hydrocarbonoxy-functional organosilicon compound; and C) a silyl hydride. A method comprises combining starting materials comprising A) the fluorinated triarylborane, B) the hydrocarbonoxy-functional organosilicon compound, and C) the silyl hydride.

DETAILED DESCRIPTION

Starting material A) in the composition and method described herein is the fluorinated triarylborane Lewis acid. The fluorinated triarylborane Lewis acid has formula:

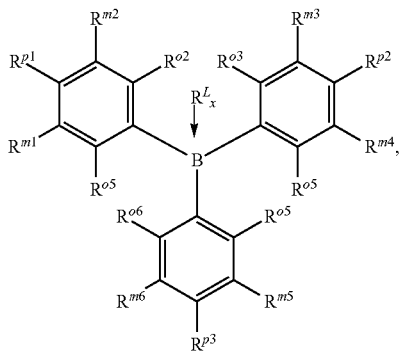

where each $R^o$ is an ortho substituent, each $R^m$ is a meta substituent, and each $R^p$ is a para substituent, $R^L$ optional and includes a functional group or a functional polymer group; and subscript x is 0 or 1. In the formula above, each of $R^{o1-6}$, each of $R^{m1-6}$ and each of $R^{p1-3}$ is independently selected from H, F, or $CF_3$; with the provisos that: not all of $R^{o1-6}$, $R^{m1-6}$, and $R^{p1-3}$ can be H simultaneously; not all of $R^{o1-6}$, $R^{m1-6}$, and $R^{p1-3}$ can be F simultaneously; and when two or more of $R^{o1-4}$ are $CF_3$, then $R^{o5}$ and $R^{o6}$ are each independently selected from H or F. $R^L$ is optional, i.e., $R^L$ is present when subscript x=1 and $R^L$ is absent when subscript x=0. $R^L$ may be a Lewis base that forms a complex with the fluorinated triarylborane Lewis acid and/or a molecule or moiety that contains at least one electron pair that is available to form a dative bond with the Lewis acid, and may be as described for $R^4$ in WO2019/055740 at paragraphs [0024] to [0025]. Examples of $R^L$ include cyclic ethers such as tetrahydrofuran or tetrahydropyran. Alternatively, $R^L$ may be tetrahydrofuran (THF).

Alternatively, each of $R^{o1}$, $R^{o2}$, $R^{o3}$, $R^{o4}$, $R^{o5}$, and $R^{o6}$ may be H. Alternatively, each of $R^{o1}$, $R^{o2}$, $R^{o3}$, and $R^{o4}$ may be H. Alternatively, each of $R^{o5}$ and $R^{o6}$ may be F.

Alternatively, each of $R^{m1}$, $R^{m2}$, $R^{m3}$, $R^{m4}$, $R^{m5}$, and $R^{m6}$ may be $CF_3$. Alternatively, each of $R^{m1}$, $R^{m2}$, $R^{m3}$, and $R^{m4}$ may be $CF_3$. Alternatively, each of $R^{m5}$ and $R^{m6}$ may be F. Alternatively, each of $R^{m5}$ and $R^{m6}$ may be H.

Alternatively, each of $R^{p1}$, $R^{p2}$, and $R^{p3}$ may be H. Alternatively, $R^{p1}$ and $R^{p2}$ may be H. Alternatively, $R^{p3}$ may be F. Alternatively, $R^{p3}$ may be $CF_3$.

Alternatively, each of $R^{o1}$, $R^{o2}$, $R^{o3}$, $R^{o4}$, $R^{o5}$, $R^{o6}$, $R^{p1}$, $R^{p2}$, and $R^{p3}$ may be H; and each of $R^{m1}$, $R^{m2}$, $R^{m3}$, $R^{m4}$, $R^{m5}$, and $R^{m6}$ may be $CF_3$. Subscript x may be 1. Alternatively, starting material A) may comprise tris(3,5-bis(trifluoromethyl)phenyl)borane THF adduct.

Alternatively, each of $R^{o1}$, $R^{o2}$, $R^{o3}$, $R^{o4}$, $R^{o5}$, $R^{o6}$, $R^{m5}$, $R^{m6}$, $R^{p1}$, and $R^{p2}$ may be H; and each of $R^{m1}$, $R^{m2}$, $R^{m3}$, $R^{m4}$, and $R^{p3}$ may be $CF_3$. Subscript x may be 1. Alternatively, starting material A) may comprise bis(3,5-bis(trifluoromethyl)phenyl)(4-trifluoromethylphenyl)borane THF adduct.

Alternatively, each of $R^{o1}$, $R^{o2}$, $R^{o3}$, $R^{o4}$, $R^{m5}$, $R^{m6}$, $R^{p1}$, and $R^{p2}$ may be H; each of $R^{o5}$, $R^{o6}$, and $R^{p3}$ may be F; and each of $R^{m1}$, $R^{m2}$, $R^{m3}$, $R^{m4}$, may be $CF_3$. Subscript x may be 1. Alternatively, starting material A) may comprise bis(3,5-bis(trifluoromethyl)phenyl)(2,4,6-trifluorophenyl)borane THF adduct.

Alternatively, each of $R^{o1}$, $R^{o2}$, $R^{o3}$, $R^{o4}$, $R^{m5}$, $R^{m6}$, $R^{p1}$, $R^{p2}$, and $R^{p3}$ may be H; $R^{o5}$ and $R^{o6}$ may be F; and each of $R^{m1}$, $R^{m2}$, $R^{m3}$, and $R^{m4}$ may be $CF_3$. Subscript x may be 1.

Alternatively, starting material A) may comprise bis(3,5-bis(trifluoromethyl)phenyl)(2,6-difluorophenyl)borane THF adduct.

Alternatively, each of $R^{o1}$, $R^{o2}$, $R^{o3}$, $R^{o4}$, $R^{o5}$, $R^{m6}$, $R^{p1}$, $R^{p2}$, and $R^{p3}$ may be H; and each of $R^{m1}$, $R^{m2}$, $R^{m3}$, $R^{m4}$, $R^{m5}$, and $R^{o6}$ may be $CF_3$. Subscript x may be 0. Alternatively, starting material A) may comprise bis(3,5-bis(trifluoromethyl)phenyl)(2,5-bis(trifluoromethyl)phenyl)borane.

Alternatively, each of $R^{m1}$, $R^{p1}$, $R^{o2}$, $R^{o3}$, $R^{o4}$, $R^{p2}$, $R^{p3}$, $R^{o5}$, and $R^{m6}$ may be H; and each of $R^{o1}$, $R^{m2}$, $R^{m3}$, $R^{m4}$, $R^{o6}$, and $R^{m5}$ may be $CF_3$. Subscript x may be 0. Alternatively, starting material A) may comprise (3,5-bis(trifluoromethyl)phenyl)bis(2,5-bis(trifluoromethyl)phenyl)borane.

Alternatively, each of $R^{o1}$, $R^{o2}$, $R^{o3}$, $R^{o4}$, $R^{p1}$, and $R^{p2}$ may be H; each of $R^{o5}$, $R^{o6}$, $R^{m5}$, and $R^{m6}$ may be F; and each of $R^{m1}$, $R^{m2}$, $R^{m3}$, $R^{m4}$, and $R^{p3}$ may be $CF_3$. Subscript x may be 1. Alternatively, starting material A) may comprise bis(3,5-bis(trifluoromethyl)phenyl)(2,3,5,6-tetrafluoro-4-trifluoromethylphenyl)borane THF adduct.

Alternatively, the fluorinated triarylborane Lewis acid may be selected from the group consisting of: A1) tris(3,5-bis(trifluoromethyl)phenyl)borane THF adduct; A2) bis(3,5-bis(trifluoromethyl)phenyl)(4-trifluoromethylphenyl)borane THF adduct; A3) bis(3,5-bis(trifluoromethyl)phenyl)(2,4,6-trifluorophenyl)borane THF adduct; A4) bis(3,5-bis(trifluoromethyl)phenyl)(2,6-difluorophenyl)borane THF adduct; A5) bis(3,5-bis(trifluoromethyl)phenyl)(2,5-bis(trifluoromethyl)phenyl)borane; A6) (3,5-bis(trifluoromethyl)phenyl)bis(2,5-bis(trifluoromethyl)phenyl)borane; A7) bis(3,5-bis(trifluoromethyl)phenyl)(2,3,5,6-tetrafluoro-4-trifluoromethylphenyl)borane THF adduct; and A8) a combination of two or more of A1) to A7). Alternatively, starting material A) may be selected from the group consisting of A1), A2), A3), A4), A5), and A7). Alternatively, starting material A) may be selected from the group consisting of: A1), A2), A3), A4), and A5). Alternatively, starting material A) may be selected from the group consisting of A1), A2) and A7). Alternatively, starting material A) may be selected from the group consisting of A2) and A5). Alternatively, starting material A) may be selected from the group consisting of A2), A3), A4), and A5).

Fluorinated triarylborane Lewis acids are known in the art, and may be prepared by known methods, for example, the methods disclosed in WO2019/055740, particularly at paragraphs [0052] to [0096] by varying appropriate starting materials.

The amount of starting material A) will depend on the type and amount of other starting materials used, however, starting material A) may be present in an amount of 0.1 ppm to 5 mol %, alternatively 0.1 ppm to 6000 ppm, alternatively 0.1 ppm to 600 ppm, alternatively 5 ppm to 6000 ppm, alternatively 5 ppm to 600 ppm, alternatively 5 ppm to 500 ppm, and alternatively 5 ppm to 100 ppm based on combined weights of starting materials A), B), and C) in the composition.

B) Organosilicon Compound

Starting material B) in the composition and method described herein is a hydrocarbonoxy-functional organosilicon compound, i.e., an organosilicon compound having an average, per molecule of at least 1 silicon-bonded group of the formula $-OR^2$, wherein each $R^2$ is an independently selected monovalent hydrocarbon group of 1 to 6 carbon atoms. Starting material B) may be one organosilicon compound or a combination of two or more organosilicon compounds that differ from one another. Examples of monovalent hydrocarbon groups for $R^2$ include alkyl groups such as methyl, ethyl, propyl (including n-propyl and isopropyl), butyl (including n-butyl, tert-butyl, sec-butyl, and iso-butyl), pentyl, and hexyl (including both linear and branched isomers of 5-6 carbon atoms); and alkenyl groups such as vinyl, allyl, butenyl, and hexenyl. Alternatively, each $R^2$ may be an alkyl group. Alternatively, each $R^2$ may be ethyl or methyl; alternatively methyl.

Starting material B) may comprise a hydrocarbonoxysilane and/or an organosiloxane oligomer or polymer. For example, the organosilicon compound may be B1) a hydrocarbonoxysilane of formula: $R^1_{(4-a)}SiOR^2_a$, where each $R^1$ is independently selected from the group consisting of a monovalent hydrocarbon group and a monovalent halogenated hydrocarbon group, each $R^2$ is the monovalent hydrocarbon group of 1 to 6 carbon atoms as described above, and subscript a is 1 to 4. Examples of suitable monovalent hydrocarbon groups for $R^1$ include, but are not limited to, alkyl such as methyl, ethyl, propyl (including n-propyl and isopropyl), butyl (including n-butyl, tert-butyl, sec-butyl, and iso-butyl) as described above for $R^2$, as well as pentyl, hexyl, heptyl, octyl, nonyl, decyl, dodecyl, undecyl, and octadecyl (and branched isomers thereof); cycloalkyl such as cyclopentyl and cyclohexyl; alkenyl such as vinyl, allyl, butenyl, and hexenyl; and aryl such as phenyl, tolyl, xylyl, naphthyl, benzyl, 1-phenylethyl, and 2-phenylethyl. Examples of monovalent halogenated hydrocarbon groups for $R^1$ include, but are not limited to, chlorinated alkyl groups such as chloromethyl and chloropropyl groups; fluorinated alkyl groups such as fluoromethyl, difluoromethyl, trifluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl. Alternatively, each $R^1$ may be a monovalent hydrocarbon group, alternatively an alkyl group or an aryl group. Alternatively, each $R^1$ may be an alkyl group, such as an alkyl group of 1 to 6 carbon atoms. Alternatively, each $R^1$ may be methyl or ethyl, alternatively methyl.

Starting material B1) may comprise an alkoxysilane exemplified by a monoalkoxysilane, such as a trialkylalkoxysilane; a dialkoxysilane, such as a dialkyldialkoxysilane; a trialkoxysilane, such as an alkyltrialkoxysilane; a tetraalkoxysilane; or a combination thereof. Examples of suitable monoalkoxysilanes include trimethylmethoxysilane (TMSOMe), trimethylethoxysilane, triethylethoxysilane, triethylmethoxysilane, vinyldimethylethoxysilane, allyldimethylmethoxysilane, vinyldimethylmethoxysilane, dimethylphenylmethoxysilane, methyldiphenylmethoxysilane, triphenylmethoxysilane, and a combination thereof. Examples of suitable dialkoxysilanes include diisobutyldiethoxysilane, n-octadecylmethyldiethoxysilane, diphenyldiethoxysilane, diphenyldimethoxysilane, di(4-tolyl)dimethoxysilane, and combinations thereof. Examples of suitable trialkoxysilanes include methyltrimethoxysilane, methyltriethoxysilane, ethyltrimethoxysilane, ethyltriethoxysilane, isobutyltrimethoxysilane, isobutyltriethoxysilane, allyltrimethoxysilane, vinyltrimethoxysilane, vinyltriethoxysilane, phenyltrimethoxysilane, p-tolyltrimethoxysilane, p-tolyltriethoxysilane, pentafluorophenyltriethoxysilane, 4-trifluoromethyltetrafluorophenyltriethoxysilane, 1-naphthyltriethoxysilane, 1-naphthyltrimethoxysilane, benzyltriethoxysilane, and a combination thereof. Examples of suitable tetraalkoxysilanes include tetraethoxysilane and tetran-propoxysilane. These alkoxysilanes are known in the art and can be made by known methods such as alkoxylation of the corresponding chlorosilane, and/or suitable alkoxysilanes are commercially available, e.g., from Gelest, Inc. of Morrisville, Pa., USA.

Other commercially available alkoxysilanes include, XIAMETER™ OFS-6070 silane, XIAMETER™ OFS-6011 silane, XIAMETER™ OFS-6020 silane, XIAMETER™ OFS-6030 silane, DOWSIL™ Z-6062 silane, DOWSIL™ Z-6300 silane, DOWSIL™ Z-6341 Silane, XIAMETER™ OFS-6040 silane, DOWSIL™ Z-6023 silane, DOWSIL™ Z-6015 silane, XIAMETER™ OFS-6920 silane, XIAMETER™ OFS-6690 silane and XIAMETER™ OFS-6076 silane; all of which are commercially available from The Dow Chemical Company of Midland, Mich., USA and/or its subsidiaries.

Alternatively, starting material B) may comprise an organosiloxane oligomer or polymer. The organosiloxane oligomer or polymer may have the hydrocarbonoxy-functional group contained in a group of formula B2):

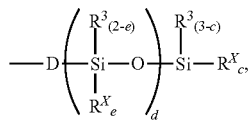

where each D independently represents an oxygen atom, a divalent hydrocarbon group, a divalent siloxane group, or a combination of a divalent hydrocarbon group and a divalent siloxane group; each $R^X$ independently represents a group of the formula $-OR^2$, wherein each $R^2$ is as described above; each $R^3$ is independently selected from the group consisting of a monovalent hydrocarbon group and a monovalent halogenated hydrocarbon group as described above for $R^1$; subscript c represents 0, 1, 2, or 3; subscript e represents 0, 1, or 2; and subscript d has a value of 0 or greater, with the proviso that the sum of (e+c) is at least 1, such that, on average, at least one $R^X$ is present in the formula. Alternatively, subscript d may have a value of 0 to 18. Alternatively, subscript c may be 1. Alternatively, subscript c may be 2 or 3. Alternatively, subscript e may be 0. Alternatively, subscript d may be 0. Alternatively, subscript d may be 2 to 5, alternatively 2 to 3.

Alternatively, each D may be independently selected from an oxygen atom and a divalent hydrocarbon group. Alternatively, each D may be an oxygen atom. Alternatively, each D may be a divalent hydrocarbon group exemplified by an alkylene group such as ethylene, propylene, butylene, or hexylene; an arylene group such as phenylene, or an alkylarylene group such as:

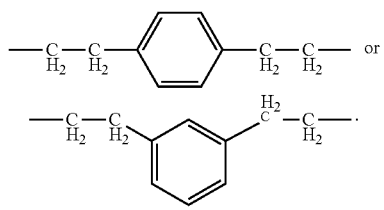

Alternatively, an instance of D may be an oxygen atom while a different instance of D is a divalent hydrocarbon group.

Alternatively, each $R^X$ may be independently selected from the group consisting of an alkoxy group and an alkenyloxy group. Alternatively, each X may be an alkoxy group, such as methoxy or ethoxy.

Alternatively, each $R^3$ in the formula above may be independently selected from alkyl groups of 1 to 20 carbon atoms, aryl groups of 6 to 20 carbon atoms, and aralkyl groups of 7 to 20 carbon atoms.

Alternatively, subscript b may be 0.

The organosiloxane oligomer or polymer may comprise the groups described by formula B2) above in an amount of said polymer ranging from 0.2 mol % to 10 mol %, alternatively 0.5 mol % to 5 mol %, alternatively 0.5 mol % to 2.0 mol %, alternatively 0.5 mol % to 1.5 mol %, and alternatively 0.6 mol % to 1.2 mol %.

Starting material B) may have a polyorganosiloxane backbone with a linear structure, i.e., a polydiorganosiloxane backbone. When starting material B) has a polydiorganosiloxane backbone, starting material B) may comprise an alkoxy-endblocked polydiorganosiloxane, an alkoxysilylhydrocarbylene-endblocked polydiorganosiloxane, or a combination thereof.

Alternatively, starting material B) may comprise a polydiorganosiloxane of formula B3):

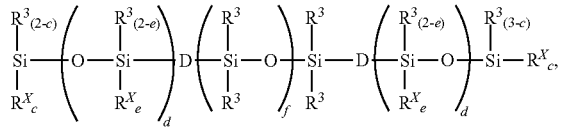

where $R^3$, RX, and subscripts c, d, and e are as described above, and subscript f has a value of 1 or more. Alternatively, subscript f may have a value sufficient to provide the polydiorganosiloxane of formula B3) with a viscosity of at least 100 mPa·s at 25° C. and/or a DP of at least 87. DP may be measured by GPC using polystyrene standards calibration. Alternatively, subscript f may have a value ranging from 1 to 200,000. Alternatively, in formula B3) above, each $R^3$ may be selected from the group consisting of alkyl, alkenyl, and aryl. Alternatively, the alkyl groups for $R^3$ may be selected from the group consisting of methyl, ethyl, and propyl. Alternatively, alkenyl groups for $R^3$ may be selected from the group consisting of vinyl, allyl, and hexenyl. Alternatively, the aryl groups for $R^3$ may be phenyl. Alternatively, in the unit formula above, each $R^X$ may be methoxy or ethoxy. Organosiloxane oligomers and polymers of formula B3) may be prepared, for example, as described in U.S. Patent Application Publication 2020-0140618 or PCT Publications WO2019/005711 or WO2019/005713.

Alternatively, the organosiloxane oligomer or polymer may comprise unit formula B4): $(R^XR^3{}_2SiO_{1/2})_o$ $(R^3{}_3SiO_{1/2})_p(R^3{}_2SiO_{2/2})_q(R^XR^3SiO_{2/2})_r(R^XSiO_{3/2})_s$ $(R^3SiO_{3/2})_t(SiO_{4/2})_u$, where $R^X$ represents the group of the formula $-OR^2$ as described above, subscripts o, p, q, and r have values such that o≥0, p≥0, q≥0, r≥0, s≥0, t≥0, u≥0, a quantity (o+r+s) has an average value of 1 or more, alternatively 1 to 6, alternatively 1 to 3, and alternatively 1 to 2; and each $R^3$ is independently selected from the group consisting of a monovalent hydrocarbon group and a monovalent halogenated hydrocarbon group as described above for $R^1$. Alternatively, a quantity (o+p+q+r+s+t+u) may be at least 3, alternatively 3 to 2000. Alternatively, a quantity (q+r) may be 1 to 2,000; alternatively 1 to 50. Alternatively, a quantity (o+p) may be 0 to 50, alternatively 0 to 2.

Alternatively, 1≥s≥0. Alternatively, 1≥t≥0. Alternatively, the quantity (o+r+s) has an average value of 1 to 6, alternatively 1 to 3, and alternatively 1 to 2. Alternatively, in unit formula B4) above, each $R^3$ may be selected from the group consisting of alkyl, alkenyl, and aryl. Alternatively, the alkyl groups for $R^3$ may be selected from the group consisting of methyl, ethyl, and propyl. Alternatively, alkenyl groups for $R^3$ may be selected from the group consisting of vinyl, allyl, and hexenyl. Alternatively, the aryl groups for $R^3$ may be phenyl. Alternatively, in the unit formula above, each $R^X$ may be methoxy or ethoxy.

Alternatively, (e.g., when o has an average value of 2, and p=r=s=t=u=0), starting material B) may comprise a polydiorganosiloxane of formula B5): $R^3_2R^XSiO\text{—}(R^3_2SiO)_b\text{—}OSiR^XR^3_2$, where each $R^3$ and each $R^X$ is are as described above, and subscript b≥1. Alternatively, subscript b may be 1 to 2,000, alternatively 5 to 900, alternatively 5 to 50, and alternatively subscript b may be 1 to 50. Alternatively, in formula B5), each $R^3$ may be independently selected from the group consisting of alkyl (e.g., methyl, ethyl, and propyl), alkenyl (e.g., vinyl, allyl, and hexenyl), and aryl (e.g., phenyl). Alternatively, in formula B5), each $R^X$ may be methoxy or ethoxy. Polydiorganosiloxanes of formula B3), such as methoxy-terminated polydimethylsiloxane with viscosity of 5 to 12 cSt are commercially available from Gelest, Inc. and 1,3-diethoxy-1,1,3,3-tetramethyldisiloxane is commercially available from Millipore Sigma of St. Louis, Mo., USA.

Alternatively, starting material B) may comprise unit formula B6): : $(R^3SiO_{3/2})_m(R^3R^XSiO_{2/2})_n(R^3_2R^XSiO_{1/2})_z$, where $R^3$ and $R^X$ are as described above, and subscript m is >0 to 100, subscript n is 0 to 100, subscript z is 0 to 20. Alternatively, subscript m may be >0 to 20, alternatively 1 to 20. Alternatively, subscript n may be 1 to 20. Alternatively, subscript z may be 0. Alternatively, subscript z may be >0 to 20. Alternatively, in unit formula B6), each $R^3$ may be independently selected from the group consisting of alkyl (e.g., methyl, ethyl, and propyl), alkenyl (e.g., vinyl, allyl, and hexenyl), aryl (e.g., phenyl), and haloalkyl (e.g., chloromethyl, chloropropyl, and trifluoropropyl). Alternatively, in unit formula B6), each $R^X$ may be methoxy or ethoxy. One skilled in the art would recognize that alkoxy-functional siloxane resins may further comprise hydroxyl groups. Examples of suitable alkoxy-functional siloxane resins of unit formula B6) include DOWSIL™ 3037, DOWSIL™ 3074, DOWSIL™ 1686, DOWSIL™ CF0189, DOWSIL™ Z-6289, DOWSIL™ US-CF2403 Resin and DOWSIL™ 2405 Resin from Dow Silicones Corporation of Midland, Mich., USA.

Suitable resins for starting material B) and methods for their preparation are known in the art. For example, the alkoxy-functional organopolysiloxane resin, or the resin—polymer blend, prepared as described in U.S. Pat. Nos. 9,670,392; 10,125,225; or PCT Publication WO2014/124389 may be used as starting material B) herein. Starting material B) may comprise one or more of the compounds described herein.

C) Silyl Hydride

Starting material C) in the composition and method described herein is a silyl hydride. The term "silyl hydride" means a molecule that contains at least one silicon-bonded hydrogen atom (SiH) per molecule. Alternatively, the silyl hydride may have more than one SiH per molecule. Silyl hydrides used herein are capable of forming a siloxane bond in the presence of A) the fluorinated triarylborane Lewis acid and B) the organosilicon compound described above. Starting material C) may comprise one silyl hydride, or a combination of two or more silyl hydrides that differ from one another.

The silyl hydride can be C1) a silane (e.g., with one silicon atom per molecule). Alternatively, the silyl hydride may be oligomeric or polymeric. Polymeric silyl hydrides can be linear, branched, or resinous. For example, the silyl hydride may be C2) a polyorganohydrogensiloxane.

C1) Silane

Starting material C1) is a silane of formula $H_kSiR^5_{(4-k)}$, where each $R^5$ is independently selected from the group consisting of a monovalent hydrocarbon group and a monovalent halogenated hydrocarbon group as described above for $R^1$, and subscript k is 1 to 3, alternatively 1 or 2, and alternatively 1. Alternatively, each $R^5$ may be an alkyl group, such as an alkyl group of 1 to 6 carbon atoms. Alternatively, each $R^5$ may be methyl or ethyl. Alternatively, starting material C1) may be a silane of formula $HSiR^5_3$, where each $R^5$ is an alkyl group of 1 to 6 carbon atoms.

Examples of suitable silanes for starting material C1) are known in the art and are commercially available. Suitable silanes include triethylsilane, dimethylethylsilane, diethylmethylsilane, dimethylisopropylsilane, dimethyl-tert-butylsilane, triisopropylsilane, chloromethyldimethylsilane, tripropylsilane, tributylsilane, triisobutylsilane, trihexylsilane, trioctylsilane, cyclohexyldimethylsilane, dimethylphenylsilane, diphenylmethylsilane, triphenylsilane, phenylsilane, bromoundecylsilane, 2-chloroethylsilane, dodecylsilane, n-octadecylsilane, and (tridecafluoro-1,1,2,2-tetrahydrooctyl)silane, which are available from Sigma-Aldrich Inc. of St. Louis Mo., USA or Gelest Inc., of Morrisville, Pa., USA.

C2) Polyorganohydrogensiloxane

When starting material C2), a polyorganohydrogensiloxane is used for the silyl hydride, the polyorganohydrogensiloxane may be a homopolymer or a copolymer. The polyorganohydrogensiloxane may be linear, branched, or resinous. The silicon-bonded hydrogen atoms in the polyorganohydrogensiloxane can be located at terminal, pendant, or at both terminal and pendant positions.

The polyorganohydrogensiloxane may comprise two or more siloxane units selected from $HR^4_2SiO_{1/2}$, $R^4_3SiO_{1/2}$, $HR^4SiO_{2/2}$, $R^4_2SiO_{2/2}$, $R^4SiO_{3/2}$, $HSiO_{3/2}$ and $SiO_{4/2}$ units. In the preceding units, each $R^4$ is an independently selected monovalent hydrocarbon group, which is free of aliphatic unsaturation. Examples of suitable monovalent hydrocarbon groups for $R^4$ include, but are not limited to, alkyl such methyl, ethyl, propyl, butyl, pentyl, hexyl, heptyl, octyl, decyl, dodecyl, undecyl, and octadecyl (and branched isomers thereof); cycloalkyl such as cyclopentyl and cyclohexyl; and aryl such as phenyl, tolyl, xylyl, naphthyl, benzyl, 1-phenylethyl, and 2-phenylethyl. Alternatively, each $R^4$ may be an alkyl group or a cycloalkyl group. Alternatively, each $R^4$ may be an alkyl group, such as methyl.

When the polyorganohydrogensiloxane is linear, i.e., is a polydiorganohydrogensiloxane, the polydiorganohydrogensiloxane may have unit formula: $(HR^4_2SiO_{1/2})_g(R^4_3SiO_{1/2})_h(R^4_2SiO_{2/2})_i(HR^4SiO_{2/2})_j$, where $R^4$ is as described above, and subscripts g, h, i, and j have values such that g≥0, h≥0, a quantity (g+h)=2, i≥0, j≥0, and a quantity (g+j)≥1, and a quantity (i+j) may be 0 to 1000.

Alternatively, the polydiorganohydrogensiloxane may have formula

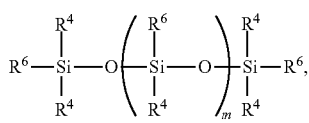

where subscript m is 0 or 1, and each $R^6$ is independently selected from the group consisting of H and $R^4$, with the proviso that at least one $R^6$, per molecule, is a hydrogen atom.

Suitable polyorganohydrogensiloxanes are exemplified by:
i) pentamethyldisiloxane,
ii) bis(trimethylsiloxy)methyl-silane,
iii) tetramethyldisiloxane,
iv) bis-dimethylhydrogensiloxy-terminated polydimethylsiloxane,
v) bis-dimethylhydrogensiloxy-terminated poly(dimethylsiloxane/methylhydrogensiloxane),
vi) bis-dimethylhydrogensiloxy-terminated polymethylhydrogensiloxane,
vii) bis-trimethylsiloxy-terminated poly(dimethylsiloxane/methylhydrogensiloxane),
viii) bis-trimethylsiloxy-terminated polymethylhydrogensiloxane,
ix) a resin consisting essentially of $H(CH_3)_2SiO_{1/2}$ units and $SiO_{4/2}$ units, and
x) a combination of two or more of i) to ix).

Methods of preparing linear and branched polyorganohydrogensiloxanes suitable for use as starting material C2), such as hydrolysis and condensation of organohalosilanes, are well known in the art, as exemplified in U.S. Pat. Nos. 5,310,843; 4,370,358; 4,707,531; and 4,329,273. Polyorganohydrogensiloxanes are also commercially available, such as those available from Gelest under the tradenames: DMS-HM15, DMS-H03, DMS-H25, DMS-H31, and DMS-H41.

D) Solvent

Starting material D) is an optional solvent, which may be used to facilitate combination of starting materials A), B), and/or C) in the composition and method described herein. Solvents used herein are those that help fluidize the starting materials, but essentially do not react with any of these starting materials. Solvent may be selected based on solubility of the starting materials and volatility of the solvent. The solubility refers to the solvent being sufficient to dissolve and/or disperse the starting materials. Volatility refers to vapor pressure of the solvent. For example, starting material A), the fluorinated triarylborane Lewis acid, may be dissolved in a solvent before step 1). Alternatively, starting material B) may be dissolved in a solvent before step 1), e.g., when starting material B) is a viscous fluid, such as a gum, or a solid at RT, such as a resin. Alternatively, starting material C) may be dissolved in a solvent before step 1), e.g., when starting material C) is a solid at RT, such as a resin. The solvent may be used in any amount, which will be selected by one of skill in the art, depending on various factors, such as the selection of starting materials A, B, and C) their solubilities.

Suitable solvents may be hydrocarbons. Suitable hydrocarbons include aromatic hydrocarbons such as benzene, toluene, or xylene; and/or aliphatic hydrocarbons such as heptane, hexane, or octane. Alternatively, the solvent may be a halogenated hydrocarbon such as dichloromethane, 1,1,1-trichloroethane or methylene chloride. One solvent, or a combination comprising two or more solvents, may be used herein.

The amount of solvent can depend on various factors including the type of solvent selected and the amount and type of other starting materials selected. However, the amount of solvent may range from 0.1% to 99%, alternatively 2% to 50%, based on combined weights of starting materials A), B), and C).

Method

The method described above comprises: 1) combining starting materials comprising A) the fluorinated triarylborane Lewis acid, B) the organosilicon compound, and C) the silyl hydride, described above. The starting materials may optionally further comprise D) the solvent, which may be used to facilitate combining starting materials A), B), and C). For example, one or more of starting materials A), B), and C) may be dissolved in the solvent before being mixed with starting material D). Alternatively, the starting materials in step 1) may consist essentially of starting materials A), B), and C) (and optionally D)), described above. Alternatively, the starting materials in step 1) may consist of starting materials A), B), and C) (and optionally D)), described above.

Combining the starting materials is performed under conditions that will react the groups of formula $OR^2$ from starting material B) and the silicon-bonded hydrogen atoms of starting material C). The resulting product of step 1) comprises a reaction product of starting materials B) and C) (which has a siloxane bond) and a side product comprising $HR^2$. These conditions may comprise mixing, e.g., by any convenient means. Mixing may be performed using conventional mixing equipment, such as an agitated batch kettle. Alternatively, when the hydrocarbonoxy-functional organosilicon compound selected for starting material B) and/or the silyl hydride selected for starting material C) is viscous or solid (e.g., gum or resin), mixing under shear may be performed, e.g., with an extruder. The composition may be formed, e.g., by mixing starting materials comprising A), B), and C) described above. Starting materials A), B), and C) may be combined at RT or less, or may be heated. For example, when heating, a temperature of 50° C. to 150° C., alternatively 100° C. to 125° C. during mixing may be used. Alternatively, the temperature for combining starting materials A), B), and C) (and D), when present) may be 5° C. to 70° C. in step 1). Starting materials A), B), and C) (and D), when present) may be combined concurrently. Alternatively, starting materials A) and B) (and D), when present) may be combined to form a mixture, and thereafter the mixture may be combined with starting material C) (and additional D), when present), e.g., by adding starting material C) (or a solvent solution thereof) to said mixture, e.g., by metering over a period of time or by adding in one or more aliquots.

The method may optionally further comprise one or more additional steps. The method may further comprise: step 2) during and/or after step 1), removing the side product of formula $HR^2$ generated during step 1) and/or step 3) removing and/or neutralizing residual fluorinated triarylborane Lewis acid in the product. By-product $HR^2$ may be removed by any convenient means, such as stripping and/or burning. Removing and/or neutralizing may be performed by adding E) a neutralizing agent to the product and optionally thereafter filtering the product. Steps 2) and 3) may be performed in any order. If a particulate by-product is present, e.g., as a result of neutralization, the method may further comprise step 4) removing a particulate such as alumina after neutralization by any convenient means, such as filtration.

Starting Material E) Neutralizing agent

Starting material E) is a neutralizing agent that may optionally be used to neutralize starting material A) in the product. Alumina, triphenylamine, triphenylphosphine, triethylamine, and phenylacetylene are suitable neutralizing agents. Neutralizing agents are known in the art and are commercially available, e.g., from Millipore Sigma of St. Louis, Mo., USA. The amount of neutralizing agent depends on various factors including the amount of starting material A), however, starting material E) may be present in an amount sufficient to provide a weight ratio of neutralizing agent to fluorinated triarylborane Lewis acid (E:A ratio) of 1:100 to 1000:1, alternatively 1:1 to 1000:1, and alternatively 1:100 to 1:1. Alternatively, when the neutralizing agent is triphenylphosphine or phenylacetylene, the E:A ratio may be 1:1 to 20:1. Alternatively, when the neutralizing agent is alumina, the E:A ratio may be 100:1 to 1000:1.

One or more of the method steps described above may be performed at a temperature of 5° C. to 150° C., alternatively 5° C. to 125° C., alternatively RT to 150° C., alternatively 5° C. to 70° C., alternatively 5° C. to 65° C., alternatively 10° C. to 60° C., alternatively 15° C. to 50° C., alternatively 20° C. to 35° C., alternatively 5° C. to 35° C., and alternatively RT. Alternatively, step 1) may be performed at the temperature of 5° C. to 70° C., alternatively 5° C. to 65° C., alternatively 10° C. to 60° C., alternatively 15° C. to 50° C., alternatively 20° C. to 35° C., alternatively 5° C. to 30° C., and alternatively 30° C. Without wishing to be bound by theory, it is thought that performing the method, particularly step 1) at relatively low temperatures (e.g., 90° C. or less, alternatively 80° C. or less, alternatively 70° C. or less, and alternatively 50° C. or less) may provide improved reaction rate, yield, or both.

Method of Use

The composition and method described above can be used in the preparation of siloxanes, intermediates, and/or branched siloxane networks. Alternatively, the composition and method described above can be used in the preparation of polyorganosiloxane—polyolefin hybrid copolymers, e.g., when starting materials B2) and B3) are used in combination. The composition and method can be used for preparation of formulations such as elastomers, silicone foams, and paper coatings.

EXAMPLES

These examples are intended to illustrate the invention and should not be interpreted as limiting the scope of the invention set forth in the claims. The starting materials described in Table 1 and the Reference Examples were used in the examples herein.

TABLE 1

Starting Materials

| Name | Chemical Description | Supplier |
| --- | --- | --- |
| FAB | Tris(pentafluorophenyl)borane | TCI |
| Heptane | n-Heptane | Millipore Sigma |
| THF | Tetrahydrofuran | Millipore Sigma |
| Toluene | Toluene | Millipore Sigma |
| DEE | Diethyl ether | Millipore Sigma |
| $CDCl_3$ | Deuterated chloroform | Cambridge Isotope Laboratories, Inc. |
| $CD_2Cl_2$ | Deuterated methylene chloride | Cambridge Isotope Laboratories, Inc. |

TABLE 1-continued

Starting Materials

| Name | Chemical Description | Supplier |
| --- | --- | --- |
| $C_6D_6$ | Deuterated benzene | Cambridge Isotope Laboratories, Inc. |
|  | A2 Alumina | Brenntag/Coastal Chemical Company |
| Q5 reactant | Oxygen scavenger | Now known as Cu-0226 S, supplied by BASF |
|  | A204 alumina | LaRoche Industries, Inc. |
|  | 4 Å mol sieves | Millipore Sigma |
|  | 3 Å mol sieves | Millipore Sigma |
| HTMS | Heptamethyltrisiloxane, which has unit formula $(Me_3SiO_{1/2})_2(MeHSiO_{2/2})$ | Sigma Aldrich |
| PMDS | Pentamethyldisiloxane, which has unit formula $(Me_3SiO_{1/2})(Me_2HSiO_{1/2})$ | Sigma Aldrich |
| TES | Triethylsilane, which has formula $(CH_3CH_2)_3SiH$ | Sigma Aldrich |
| TMSOMe | Trimethylmethoxysilane, which has formula $(CH_3)_3Si(OCH_3)$ | Sigma Aldrich |

REFERENCE EXAMPLE 1—GENERAL PROCEDURES

Unless otherwise noted, all experimental procedures and manipulations of chemical substances were performed in a nitrogen-purged glove box or on a Schlenk line. All bulk reaction solvents (toluene, diethyl ether, hexane, tetrahydrofuran (THF)) were dried by passage through columns of alumina and Q5 reactive scavenger. All other solvents were purchased from Aldrich anhydrous grade and stored over activated 3 Å molecular sieves prior to use. NMR solvents ($CDCl_3$, $CD_2Cl_2$, and $C_6D_6$), obtained from Cambridge Isotope Laboratories, Inc., were dried over active 3 Å molecular sieves or, in the case of $C_6D_6$, dried using Na/K alloy. 1-Bromo-3,5-bis(trifluoromethyl)benzene, 1-bromo-2,5-bis(trifluoromethyl)benzene, 1-bromo-2,6-difluorobenzene, 1-bromo-2,4,6-trifluorobenzene, and 1-bromo-4-trifluoromethylbenzene were purchased from Oakwood Chemical. 1-Bromo-2,3,5,6-tetrafluoro-4-trifluoromethylbenzene was purchased from Alfa Aesar. FAB was purchased from TCI. All other reagents were purchased from Sigma-Aldrich and used as received. n-Butyllithium (solution in hexanes) was titrated using 1.00 M decanol in toluene with 1,10-phenanthroline as an indicator prior to use.[1]

[1] Watson, S. C.; Eastham, J. F. "Colored indicators for simple direct titration of magnesium and lithium reagents", *J. Organomet. Chem.*, 1967, 9, 165-168.

Multinuclear NMR spectra ($^1H$, $^{13}C$, $^{19}F$, $^{29}Si$, $^{11}B$) were collected on one of the following instruments: Varian MR-400 or Varian VNMRS-500. $^{11}B$ NMR spectra were collected only on the Varian VNMRS-500. The $^1H$ and $^{13}C$ NMR chemical shifts were referenced in parts per million relative to residual solvent peaks: $^1H$—5.32 ppm for $CD_2Cl_2$, 7.15 ppm for $C_6D_6$, 7.25 ppm for $CDCl_3$; $^{13}C$—54.00 ppm for $CD_2Cl_2$, 128.00 ppm for $C_6D_6$, 77.00 ppm for $CDCl_3$. $^{11}B$ NMR chemical shifts were referenced externally to $BF_3(Et_2O)$ (0 ppm), $^{19}F$ NMR chemical shifts were referenced externally to $CFCl_3$ (0 ppm). Sub-ambient reaction temperatures, except when dry ice or ice were the sole means of cooling, were measured using an Extech Instruments EasyView™ 10 Dual K model EA 10 thermometer with a fine JKEM sensor PTFE wire K 36INJ.

REFERENCE EXAMPLE 2—SYNTHETIC PROCEDURES—PREPARATION OF STARTING MATERIALS

Preparation of lithium(diethyletherate) (3,5-bis(trifluoromethyl)phenyl)triisopropoxyborate was performed as follows:

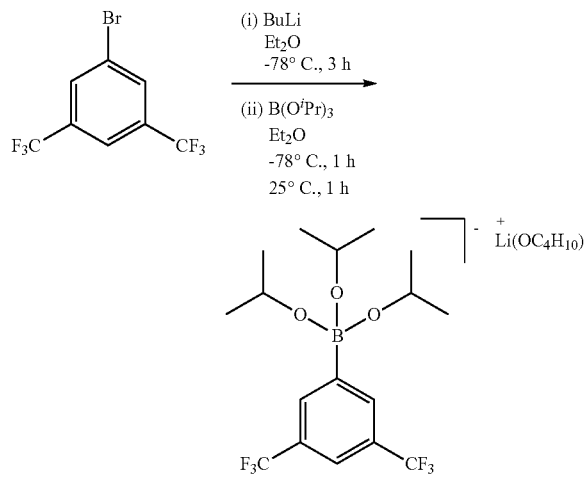

To a cold (−78° C., CO$_2$(s) bath) solution of 1-bromo-3,5-bis(trifluoromethyl)benzene (18.52 g, 63.19 mmol) in diethyl ether (200 mL) was added n-butyllithium (23.0 mL, 2.61 M in hexanes, 60.03 mmol) with stirring. The reaction mixture was stirred for 3 hours at −78° C. with formation of precipitate. Triisopropylborate (11.86 g, 63.06 mmol) in ether (20 mL) was added slowly. The reaction mixture was stirred for 1 hour at −78° C., then was allowed to warm to ambient temperature and was stirred for 1 hour to give a slightly cloudy solution. The reaction mixture was filtered and the volatiles were removed under reduced pressure to give a solid. The solid was triturated with hexane, filtered, and the volatiles were removed under reduced pressure to give the product as a colorless powder. Yield: 23.16 g, 94.53%. The compound was initially isolated as its ether adduct.

$^1$H NMR (500 MHz, THF-d$_8$) δ 8.15 (s, 2H), 7.57 (s, 1H), 3.79 (p, J=6.1 Hz, 3H), 0.95 (d, J=6.1 Hz, 18H). $^{13}$C NMR (126 MHz, THF-d$_8$) δ 159.12, 134.71, 128.90 (q, J=31.3 Hz), 125.91 (q, J=271.8 Hz), 118.70, 67.41 (dtd, J=44.2, 22.2, 2.9 Hz), 61.67, 26.53 (d, J=17.7 Hz), 25.28 (dtd, J=40.4, 20.1, 3.0 Hz). $^{19}$F NMR (470 MHz, THF-d$_8$) δ −63.02. $^{11}$B NMR (160 MHz, THF-d$_8$) δ 3.84.

Preparation of (3,5-bis(trifluoromethyl)phenyl)diisopropoxyborane was performed as follows:

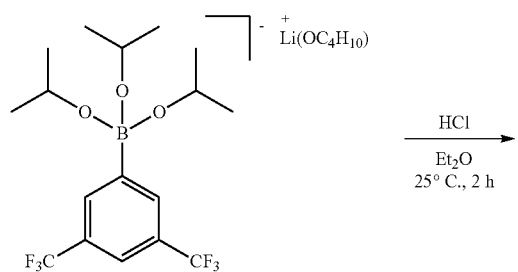

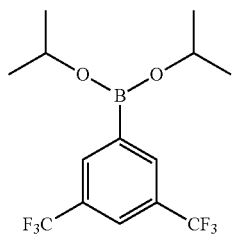

To a solution of lithium(diethyletherate) (3,5-bis(trifluoromethyl)phenyl)triisopropoxyborate (8.00 g, 19.6 mmol) in diethyl ether (100 mL) was added hydrogen chloride solution (12.3 mL, 2 M in ether, 24.6 mmol) with immediate formation of precipitate. The reaction mixture was stirred for two hours, filtered, and the volatiles were removed under reduced pressure. The resultant residue was extracted with hexane, filtered, and the volatiles were removed under reduced pressure to give the product as an oil. Yield: 5.10 g, 76.1%.

$^1$H NMR (500 MHz, Chloroform-d) δ 8.01 (d, J=1.9 Hz, 2H), 7.89 (dt, J=2.0, 1.0 Hz, 1H), 4.59 (hept, J=6.1 Hz, 1H), 1.27 (d, J=6.2 Hz, 6H). $^{13}$C NMR (126 MHz, Chloroform-d) δ 134.19, 132.85 (td, J=3.7, 1.9 Hz), 130.85 (q, J=32.9 Hz), 123.67 (d, J=272.6 Hz), 123.04 (hept, J=3.9 Hz), 67.00, 24.58. $^{19}$F NMR (470 MHz, Chloroform-d) δ −63.34. $^{11}$B NMR (160 MHz, Chloroform-d) δ 26.66.

Preparation of lithium(diethyletherate) bis(3,5-bis(trifluoromethyl)phenyl)diisopropoxyborane was performed as follows:

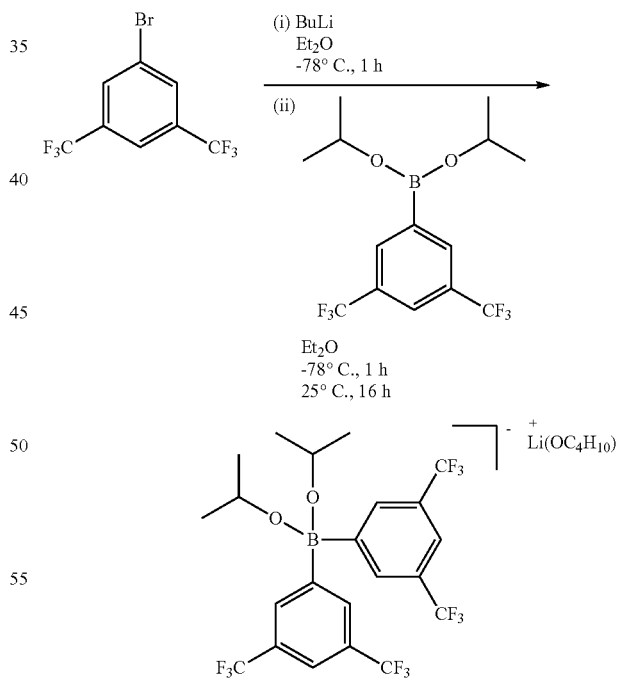

To a cold (−78° C., CO$_2$(s) bath) solution of 1-bromo-3,5-bis(trifluoromethyl)benzene (4.26 g, 14.5 mmol) in diethyl ether (200 mL) was added n-butyllithium (5.30 mL, 2.61 M in hexanes, 60.0 mmol) with stirring. The reaction mixture was stirred for 1 hour at −78° C. with formation of precipitate. (3,5-Bis(trifluoromethyl)phenyl)diisopropoxyborane (4.82 g, 14.1 mmol) in ether (15 mL) was added slowly. The reaction mixture was stirred for 1 hour at −78° C. (some solids visible), then was allowed to warm to ambient temperature and was stirred overnight to give a clear solution. The volatiles were removed under reduced pressure to give a crystalline-appearing solid. The solid was dissolved in hexane, the solution was filtered and placed in the freezer over the weekend. A large amount of crystalline material formed. The supernatant was decanted and the volatiles were removed under reduced pressure to give a colorless crystalline material. Yield of material: 8.23 g, 93.5%.

$^1$H NMR (400 MHz, Chloroform-d) δ 7.99 (d, J=1.9 Hz, 2H), 7.74 (dt, J=1.8, 1.0 Hz, 1H), 3.81 (q, J=7.1 Hz, 2H), 3.35 (hept, J=6.1 Hz, 1H), 1.45 (t, J=7.1 Hz, 3H), 0.78 (d, J=6.1 Hz, 6H). $^{13}$C NMR (101 MHz, Chloroform-d) δ 153.43, 134.19-133.42 (m), 129.51 (q, J=31.9 Hz), 124.42 (q, J=272.4 Hz), 119.68 (hept, J=4.0 Hz), 66.83, 63.03, 25.48, 14.66. $^{19}$F NMR (376 MHz, Chloroform-d) δ −63.05. $^{11}$B NMR (160 MHz, Chloroform-d) δ 5.12.

Preparation of bis(3,5-bis(trifluoromethyl)phenyl)isopropoxy borane was performed as follows:

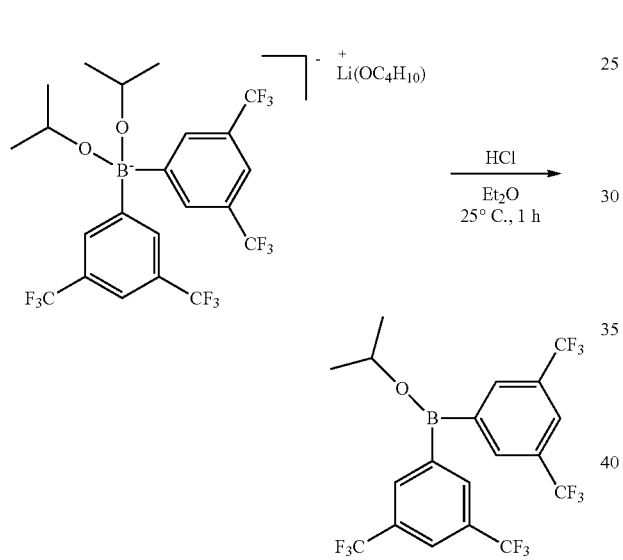

To a solution of lithium(diethyletherate) bis(3,5-bis(trifluoromethyl)phenyl)diisopropoxyborate (5.00 g, 7.86 mmol) in diethyl ether (100 mL) was added hydrogen chloride solution (5.5 mL, 2 M in ether, 11 mmol) with immediate formation of precipitate. The reaction mixture was stirred for one hour and the volatiles were removed under reduced pressure. The residue was extracted with hexane, filtered, and the volatiles were removed under reduced pressure to give the product as a colorless powder. Yield: 3.98 g, 102% (some residual solvent present).

$^1$H NMR (400 MHz, Chloroform-d) δ 8.00 (ddd, J=2.2, 1.4, 0.7 Hz, 2H), 7.98 (dq, J=1.9, 0.6 Hz, 4H), 4.54 (hept, J=6.1 Hz, 1H), 1.37 (d, J=6.1 Hz, 6H). $^{13}$C NMR (101 MHz, Chloroform-d) δ 138.42, 133.32, 131.36 (q, J=33.2 Hz), 124.39 (p, J=3.8 Hz), 123.39 (d, J=272.8 Hz), 71.74, 24.62. $^{19}$F NMR (376 MHz, Chloroform-d) δ −63.33. $^{11}$B NMR (160 MHz, Chloroform-d) δ 41.80.

Synthetic Procedures—Preparation of Catalysts

Catalyst Sample C1, tris(3,5-bis(trifluoromethyl)phenyl) borane THF adduct, was prepared as follows:

Preparation of lithium isopropoxytris(3,5-bis(trifluoromethyl)phenyl)borate

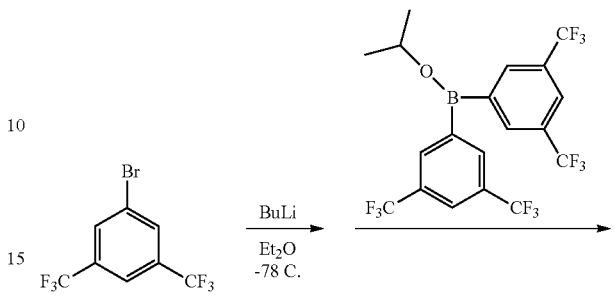

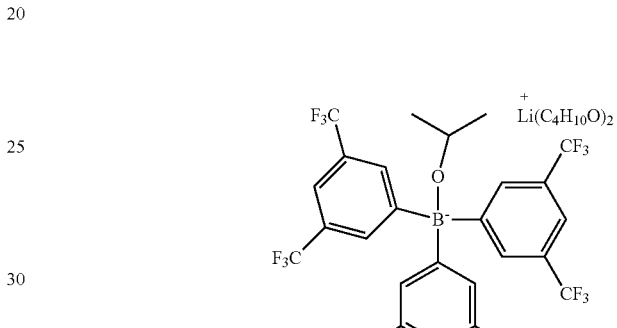

n-Butyllithium (5.00 mL, 2.5 M in hexanes, 12.7 mmol) was added slowly dropwise to a cold (−78° C., CO$_2$(s) bath) solution of 1-bromo-3,5-bis(trifluoromethyl)benzene (3.76 g, 12.8 mmol) in diethyl ether (150 mL). The reaction mixture was stirred for 1 hour at −78° C. Isopropoxy-bis(3,5-bis(trifluoromethyl)phenyl)borane (6.29 g, 12.7 mmol) in ether (10 mL) was added slowly. The reaction mixture was stirred overnight while warming to ambient temperature to give a clear very pale-yellow solution. The volatiles were removed under reduced pressure to give a crystalline solid. The solid was dissolved in a minimum of boiling ether and the solution was placed in the freezer. After cooling overnight, the supernatant was decanted from the crystals which had formed and the crystals were dried under reduced pressure to give 6.74 g. A second crop of crystalline material (1.54 g) was obtained from concentrating the supernatant solution and cooling in the freezer overnight. Total yield: 8.28 g, 75.6%.

$^1$H NMR (400 MHz, Benzene-d$_6$) δ 8.09 (s, 6H), 7.74 (s, 3H), 3.71 (p, J=6.1 Hz, 1H), 2.97 (q, J=7.0 Hz, 10H), 0.70 (t, J=7.1 Hz, 15H), 0.67 (d, J=6.2 Hz, 6H). $^{13}$C NMR (101 MHz, Benzene-d$_6$) δ 157.09, 133.79, 130.75 (q, J=32.0 Hz), 124.71 (q, J=272.8 Hz), 119.91 (p, J=4.2 Hz), 65.91, 65.00, 25.47, 14.11. $^{19}$F NMR (376 MHz, Benzene-d$_6$) δ −62.76. $^{11}$B NMR (160 MHz, Benzene-d$_6$) δ 1.56.

Preparation of tris(3,5-bis(trifluoromethyl)phenyl)borane THF adduct

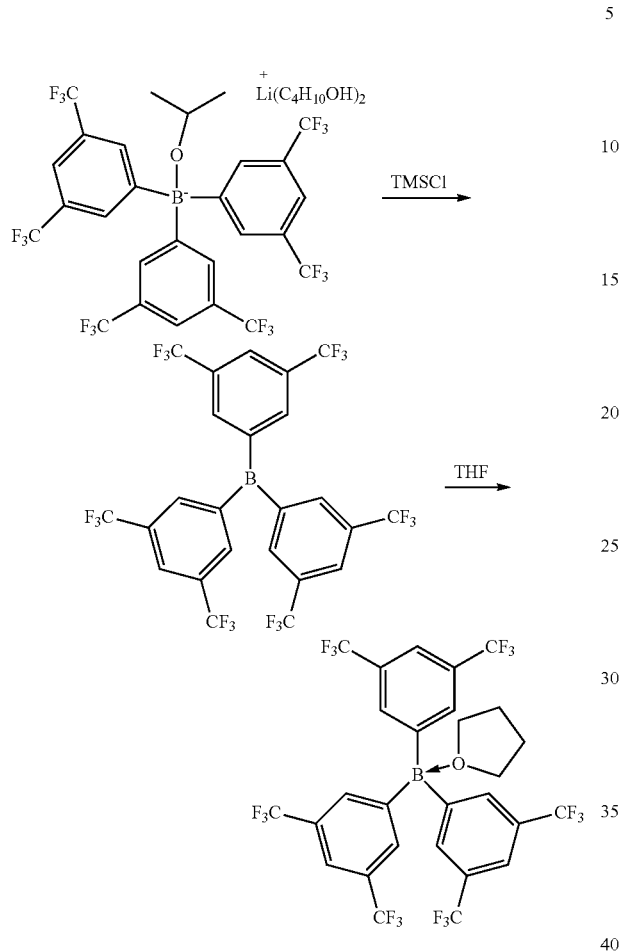

To a solution of lithium isopropoxytris(3,5-bis(trifluoromethyl)phenyl)borate (6.700 g, 7.75 mmol) in ether (100 mL) was added chlorotrimethylsilane (2.0 mL, 1.71 g, 15.8 mmol). The reaction mixture was stirred over the weekend. The reaction mixture was filtered and the volatiles were removed under reduced pressure to give the product as a colorless solid, 4.80 g, 95.2%.

Part of the solid (4.041 g) was dissolved in ether (100 mL) and THF (5 mL) was added. The volatiles were removed from the reaction mixture under reduced pressure. The residue was extracted with benzene, filtered, and the volatiles were removed from the reaction mixture under reduced pressure to give the THF-adduct product as a colorless solid, 4.10 g, 91.3%.

THF adduct: $^1$H NMR (400 MHz, Benzene-$d_6$) δ 7.80-7.78 (m, 6H), 7.72 (dq, J=1.8, 0.9 Hz, 3H), 2.90-2.83 (m, 4H), 0.57-0.49 (m, 4H). $^{13}$C NMR (101 MHz, Benzene-$d_6$) δ 148.11, 133.40, 131.38 (q, J=32.5 Hz), 124.21 (q, J=272.8 Hz), 121.37 (p, J=4.1 Hz), 74.14, 23.94 (d, J=2.7 Hz). $^{19}$F NMR (376 MHz, Benzene-$d_6$) δ −62.95. $^{11}$B NMR (160 MHz, Benzene-$d_6$) δ 11.84.

Catalyst sample C2, bis(3,5-bis(trifluoromethyl)phenyl)(4-trifluoromethylphenyl)borane THF adduct, was prepared as follows.

Preparation of bis(3,5-bis(trifluoromethyl)phenyl)(4-trifluoromethylphenyl)borane

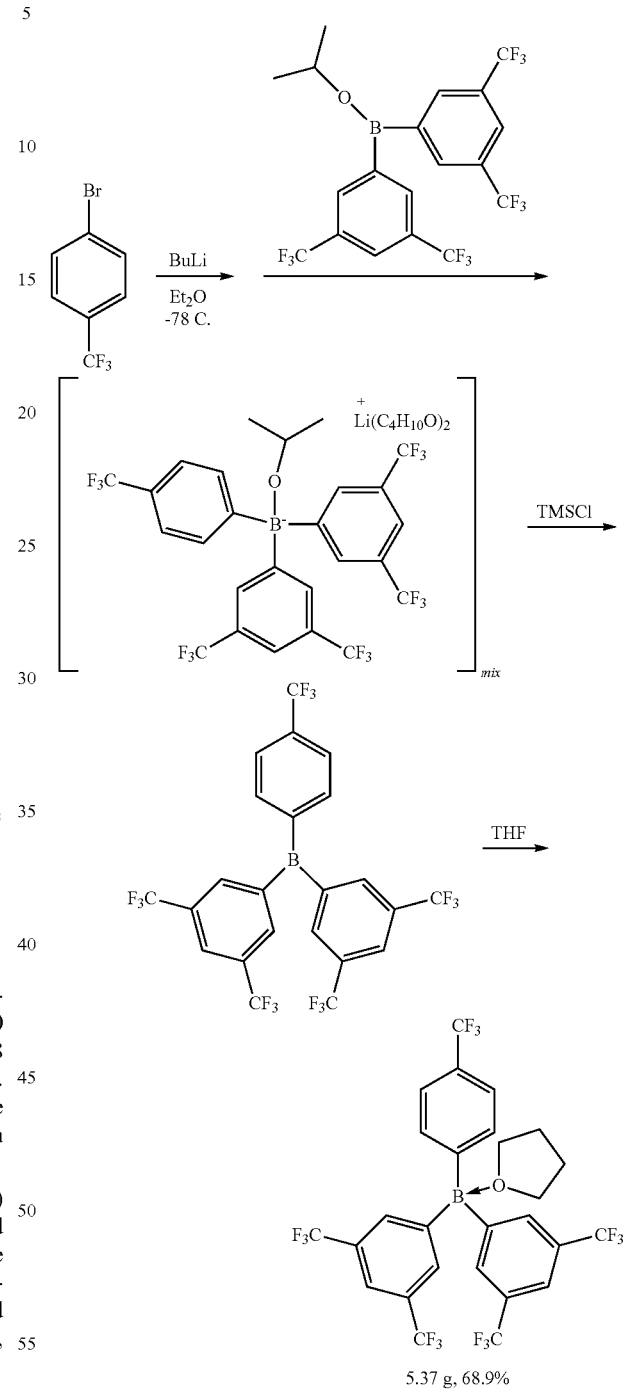

5.37 g, 68.9% n-Butyllithium (4.70 mL, 2.535 M in hexanes, 11.9 mmol) was added slowly dropwise to a cold (−78° C., $CO_2$(s)/acetone bath) solution of 1-bromo-4-trifluoromethylbenzene (2.750 g, 12.22 mmol) in diethyl ether (200 mL). The reaction mixture was stirred for 3 hours at −78° C. Isopropoxybis(3,5-bis(trifluoromethyl)phenyl)borane (5.910 g, 11.91 mmol) in diethyl ether (15 mL) was added slowly. The reaction mixture was allowed to warm to ambient temperature while stirring overnight to give a clear yellow solution with a trace of precipitate. The solvent was removed under reduced pressure to give a thick yellow oil. The oil was stirred at a rapid rate with hexane (100 mL) overnight (some cloudiness develops). The hexane layer was decanted off, filtered, and the volatiles were removed under reduced pressure. The oil layer was extracted again with hexane and the process was repeated several times. A small amount of oil that hadn't dissolved was discarded. The volatiles were removed under reduced pressure from the filtrate to give a yellow oil. The oil was dissolved in diethyl ether (100 mL) and trimethylsilylchloride (1.5 g, 13.8 mmol) was added. Within 30 minutes copious precipitate had formed. The reaction mixture was allowed to stir overnight. The reaction mixture was filtered and the volatiles were removed under reduced pressure to give a pasty beige sludge. NMR spectra showed nearly complete reaction. The product was dissolved in ether and more TMSCl was added (0.4 mL). After stirring for several hours, the volatiles were removed under reduced pressure. The residue was extracted with benzene, filtered, and the volatiles were removed under reduced pressure to give a pasty solid. $^1$H NMR spectroscopy still showed some isopropyl groups and some ether. The residue was dissolved in ether, a small amount of TMSCl (0.2 mL) was added, and the reaction mixture was stirred for several hours. Several milliliters of THF were added and the volatiles were removed under reduced pressure. The product was extracted with benzene, filtered, and the volatiles were removed under reduced pressure to give the product as a white solid (5.370 g, 68.90%).

NMR spectra of the borane-THF complex: $^1$H NMR (400 MHz, Benzene-$d_6$) δ 7.83 (s, 4H), 7.78 (tq, J=1.7, 0.8 Hz, 2H), 7.41 (dq, J=7.4, 0.8 Hz, 2H), 7.07 (dq, J=7.5, 0.9 Hz, 2H), 3.04-2.96 (m, 4H), 0.70-0.62 (m, 4H). $^{13}$C NMR (126 MHz, Benzene-$d_6$) δ 149.08, 148.88, 134.18, 133.62 (d, J=3.8 Hz), 131.11 (q, J=32.4 Hz), 129.94 (q, J=32.1 Hz), 125.06 (d, J=272.1 Hz), 124.92 (q, J=3.8 Hz), 124.34 (q, J=272.7 Hz), 121.22 (dt, J=8.0, 4.0 Hz), 73.53, 24.10. $^{19}$F NMR (376 MHz, Benzene-$d_6$) δ −62.56 (s, 3F), −62.78 (s, 12F). $^{11}$B NMR (160 MHz, Benzene-$d_6$) δ 18.54.

Catalyst sample C3, bis(3,5-bis(trifluoromethyl)phenyl)(2,4,6-trifluorophenyl)borane THF adduct, was prepared as follows:

Preparation of lithium bis(diethyletherate) bis(3,5-bis(trifluoromethyl)phenyl)(2,4,6-trifluorophenyl)-isopropoxyborate

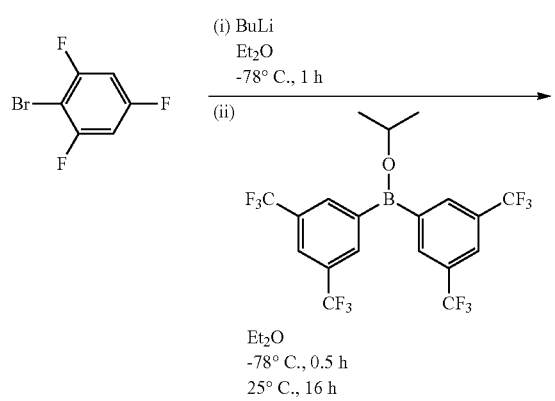

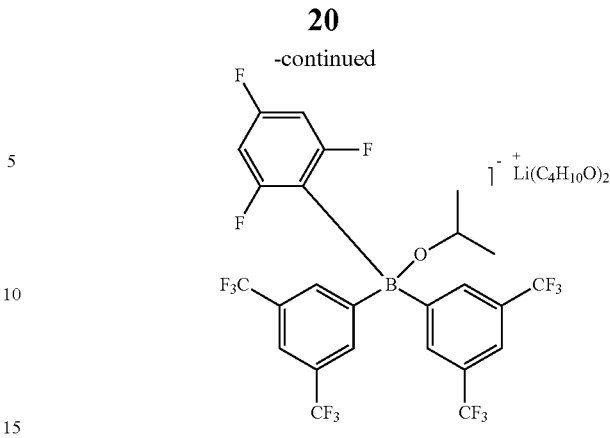

In a $N_2$-purged glove box, 2.06 g (9.78 mmol) of 1-bromo-2,4,6-trifluorobenzene was combined with 80 mL of diethyl ether in a 250-mL Schlenk flask. A Teflon-coated stir bar was added to the colorless solution and the flask was sealed with a rubber septum before being removed from the glove box. In a fume hood, the flask was connected to a nitrogen line and placed in a dry ice/acetone bath (−78° C.) for 20 minutes to chill. A 2.5 M solution of n-butyllithium in hexane (4.3 mL, 10.8 mmol) was added via syringe to the cold solution. The reaction mixture was stirred at −78° C. for 1 hour. A solution of 4.85 g of bis(3,5-bis(trifluoromethyl)phenyl)isopropoxyborane in 20 mL of diethyl ether was prepared in the glove box and drawn up into a syringe. The solution was injected into the flask containing the cold aryllithium solution at −78° C. and the mixture was stirred for half an hour at this temperature. The dry ice/acetone bath was removed and the reaction mixture was allowed to slowly warm to room temperature while stirring overnight. Then next morning, all volatiles were removed under vacuum to yield a sticky yellow solid. The flask was returned to the glove box and the sticky yellow material was extracted with 1) 80 mL of pentane, 2) 80 mL of hexanes, and 3) 60 mL of a 50/50 ether/hexanes mixture. All three solutions were placed in the glove box freezer overnight (−40° C.) and white crystalline material precipitated from solution. The crystalline material was collected by filtration, washed with cold pentane (−40° C.), and dried under vacuum for 1 hour. Total yield: 5.29 g (impure, approx. 5.5 mmol of desired lithium salt, 56%). It should be noted that pure material was not obtained; the lithium salt was contaminated with the isopropoxyborane starting material (12%-22% contaminated, depending on the batch of solid material collected). It was decided to proceed to the next step in the reaction without any further purification of the isolated material.

$^1$H NMR (400 MHz, Benzene-$d_6$) δ 8.26 (s, 4H, ortho-ArCH), 7.80 (s, 2H, para-ArCH), 6.22-6.07 (m, 2H, ortho-ArCH), 3.68 (hept, J=5.8 Hz, 1H, CH(CH$_3$)$_2$), 3.07 (q, J=7.1 Hz, 8H, OCH$_2$), 0.81 (t, J=7.1 Hz, 12H, OCH$_2$CH$_3$), 0.67 (d, J=6.2 Hz, 6H, CH(CH$_3$)$_2$). $^{13}$C NMR (101 MHz, Benzene-$d_6$) δ 166.2 (ddd, J=231.3, 22.4, 14.0 Hz, ArC), 162.3 (dt, J=247.1, 20.2 Hz, ArC), 159.5 (br s, ArC), 157.3 (br s, ArC), 133.8 (s, ortho-ArCH), 130.7 (q, J=31.9 Hz, ArC-CF$_3$), 125.5 (q, J=272.4 Hz, CF$_3$), 119.9 (p, J=4.0 Hz, para-ArCH), 101.0 (ddd, J=36.6, 24.0, 3.7 Hz, meta-ArCH), 65.9 (s, OCH(CH$_3$)$_2$), 65.8 (s, OCH$_2$CH$_3$), 25.7 (s, OCH(CH$_3$)$_2$), 14.7 (s, OCH$_2$CH$_3$). $^{19}$F NMR (376 MHz, Benzene-$d_6$) δ −62.7 (s, 12F, CF$_3$), −104.4 (br s, 2F, ortho-ArF), −112.3 (m, 1F, para-ArF).

Preparation of bis(3,5-bis(trifluoromethyl)phenyl)(2,4,6-trifluoroborane

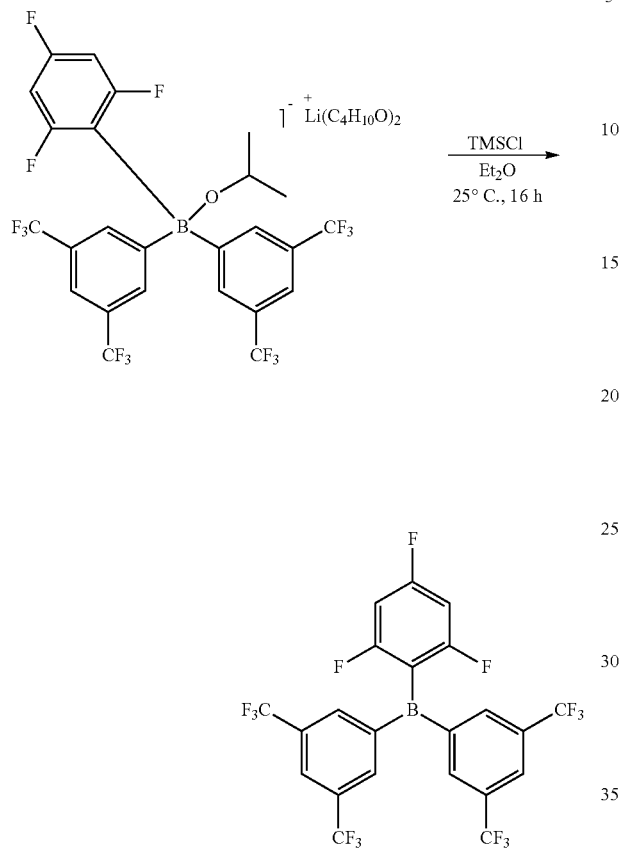

In a N$_2$-purged glove box, 3.30 g (78% pure, 3.29 mmol) of the lithium borate salt was dissolved in 60 mL of diethyl ether to form a colorless solution (note: the lithium borane salt was contaminated with 22% bis(3,5-bis(trifluoromethyl)phenyl)isopropoxyborane). Trimethylsilylchloride (1.0 mL, 7.9 mmol) was added with stirring to the solution at room temperature. There was no immediate sign of a reaction. The mixture was allowed to stir overnight at room temperature. The next morning, a copious amount of LiCl precipitate had formed in the flask. An aliquot of the reaction mixture was removed and analyzed by $^{19}$F NMR spectroscopy to confirm that the reaction had gone to completion. The reaction mixture was filtered through Celite to remove LiCl and the filtrate was pumped down to dryness. The resultant sticky white solid was extracted with 80-90 mL of hexanes and filtered again. The hexanes solution was placed in the glove box freezer overnight (−40° C.), during which time a white microcrystalline solid precipitated. The solid was collected by filtration, washed with 5-10 mL of cold pentane (−40° C.), and dried under vacuum for 1 hour. Multinuclear NMR spectroscopy confirmed formation of the desired material in pure form. Yield: 0.992 g, 1.75 mmol, 53.2%.

$^1$H NMR (400 MHz, Benzene-d$_6$) δ 7.88 (s, 6H, ArCH on CF$_3$-substituted ring), 6.03 (m, 2H, ArCH on 2,4,6-trifluorophenyl ring). $^{13}$C NMR (101 MHz, Benzene-d$_6$) δ 167.4 (dt, J=257.6, 16.2 Hz, para-ArCF), 166.2 (dt, J=253.5, 15.2 Hz, ortho-ArCF), 142.8 (br s, ArC), 137.5 (d, J=3.0 Hz, ortho-ArCH), 132.1 (q, J=33.4 Hz, ArC-CF$_3$), 126.9 (pent, J=4.0 Hz, para-ArCH), 124.1 (q, J=273.0 Hz, CF$_3$), 112.6 (br s, ArC), 101.6 (ddd, J=29.0, 24.9, 3.7 Hz, meta-ArCH). $^{19}$F NMR (376 MHz, Benzene-d$_6$) δ −63.1 (s, 12F, CF$_3$), −92.4 (m, 2F, ortho-ArCF), −98.5 (s, 1F, para-ArCF). $^{11}$B NMR (160 MHz, Benzene-d$_6$) δ 62.9 (broad s).

Preparation of THF adduct of bis(3,5-bis(trifluoromethyl)phenyl)(2,4,6-trifluoroborane

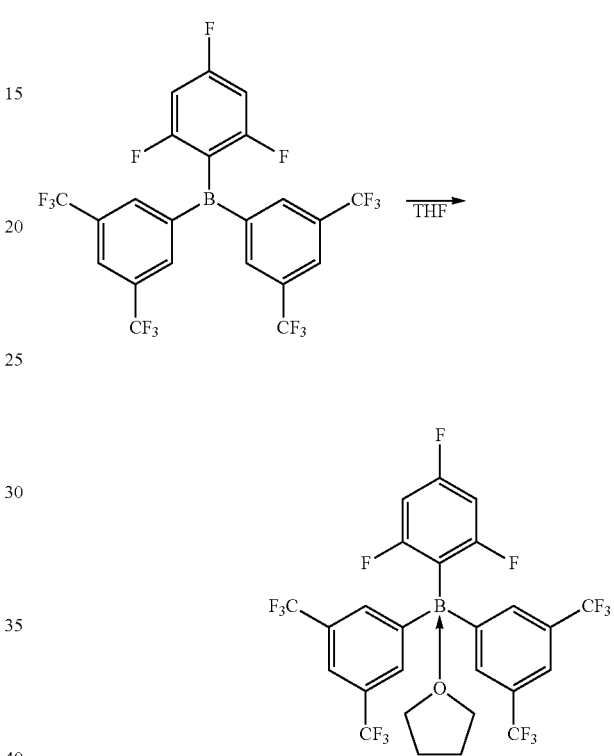

In a N$_2$-purged glove box, 0.992 g (1.75 mmol) of bis(3,5-bis(trifluoromethyl)phenyl)(2,4,6-trifluorophenyl)borane was weighed into a 110-mL glass jar and dissolved in 50 mL of THF. The THF was removed under vacuum with stirring to yield a white solid. The solid was triturated with 40 mL of pentane to help remove any uncoordinated THF. The white solid was characterized by multinuclear NMR spectroscopy as the mono-THF adduct of bis(3,5-bis(trifluoromethypphenyl)(2,4,6-trifluoro-phenyeborane. Yield: 0.969 g, 1.51 mmol, 86.3%.

$^1$H NMR (400 MHz, Benzene-d$_6$) δ 7.96 (s, 4H, ortho-ArCH), 7.79 (s, 2H, para-ArCH), 6.16 (t, J=8.0 Hz, 2H, meta-ArCH), 3.10 (m, 4H, OCH$_2$), 0.79 (m, 4H, CH$_2$). $^{13}$C NMR (101 MHz, Benzene-d$_6$) δ 165.3 (ddd, J=245.4, 17.7, 14.3 Hz, ortho-ArCF), 163.9 (dd, J=249.5, 16.2 Hz, para-ArCF), 148.4 (br s, ArC), 134.0 (s, ortho-ArCH), 131.4 (q, J=32.4 Hz, ArC-CF$_3$), 121.8 (m, para-ArCH), 124.8 (q, J=272.7 Hz, CF$_3$), 101.3 (ddd, J=32.8, 24.2, 3.2 Hz, meta-ArCH), 72.6 (s, OCH$_2$), 24.8 (s, CH$_2$). $^{19}$F NMR (376 MHz, Benzene-d$_6$) δ −62.8 (s, 12F, CF$_3$), −96.9 (s, 2F, ortho-ArCF), −108.5 (s, 1F, para-ArCF). $^{11}$B NMR (160 MHz, Benzene-d$_6$) δ 13.2 (broad s).

Catalyst sample C4, bis(3,5-bis(trifluoromethyl)phenyl)(2,6-difluorophenyl) THF adduct, was prepared as follows:

Preparation of lithium bis(diethyletherate) bis(3,5-bis(trifluoromethyl)phenyl)(2,6-difluorophenyl)-isopropoxy borate

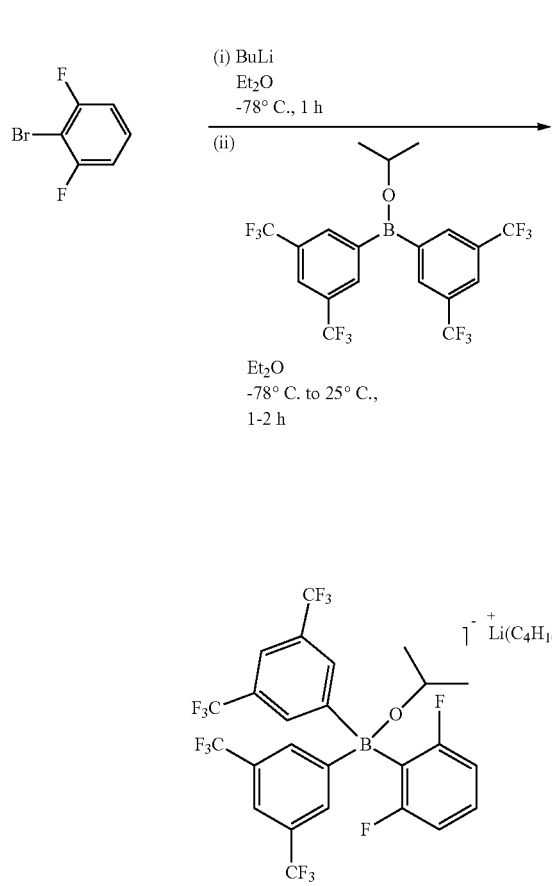

Preparation of THF adduct of bis(3,5-bis(trifluoromethyl)phenyl)(2,6-difluorophenyl)borane

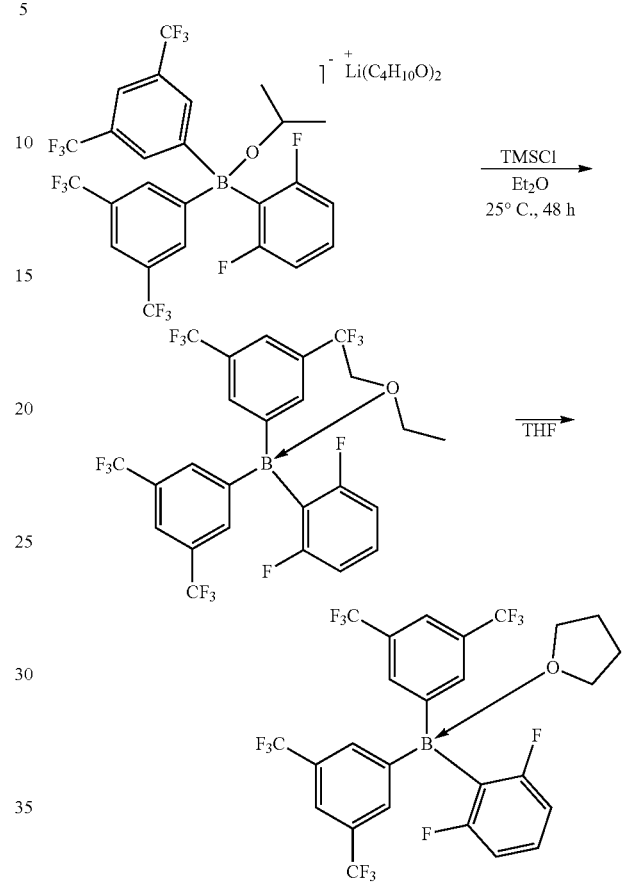

n-Butyllithium (3.00 mL, 2.48 M in hexanes, 7.44 mmol) was added slowly dropwise to a cold (−78° C., CO$_2$(s) bath) solution of 1-bromo-2,6-difluorobenzene (1.46 g, 7.56 mmol) in diethyl ether (100 mL). The reaction mixture was stirred for 1 hour at −78° C. and then a solution of bis(3,5-bis(trifluoromethyl)phenyl)isopropoxyborane (3.69 g, 7.44 mmol) in ether (10 mL) was added slowly. Precipitate formed while the reaction mixture was allowed to warm to ambient temperature. By the time the reaction mixture had reached room temperature, the precipitate had dissolved to give a clear solution which was stirred for several hours. The solution was filtered and the volatiles were removed under reduced pressure to give a crystalline-appearing solid. The solid was dissolved in a minimum of boiling ether and the solution was placed in the glove box freezer (−33° C.). After cooling overnight, the supernatant was decanted from the crystals which had formed. The crystals were dried under reduced pressure. Yield: 6.85 g, 88.4%.

$^1$H NMR (400 MHz, Benzene-d$_6$) δ 8.31 (s, 4H), 7.77 (tt, J=2.0, 0.9 Hz, 2H), 6.60 (dq, J=8.8, 7.5 Hz, 1H), 6.47-6.41 (m, 2H), 3.71 (hept, J=6.2 Hz, 1H), 3.05 (qd, J=7.1, 0.7 Hz, 8H), 0.82 (td, J=7.1, 0.6 Hz, 12H), 0.68 (d, J=6.2 Hz, 6H). $^{13}$C NMR (126 MHz, Benzene-d$_6$) δ 164.45 (dd, J=249.6, 11.3 Hz), 142.11, 137.21, 136.78 (t, J=3.8 Hz), 135.51 (t, J=10.8 Hz), 131.28 (q, J=33.3 Hz), 126.10 (p, J=3.8 Hz), 123.30 (q, J=273.1 Hz), 111.72-111.40 (m), 73.82, 65.57, 15.11, 2.57. $^{19}$F NMR (376 MHz, Benzene-d$_6$) δ −62.64, −106.66. $^{11}$B NMR (160 MHz, Benzene-d$_6$) δ 0.68 (s).

Lithium bis(diethyletherate) bis(3,5-bis(trifluoromethyl)phenyl)(2,6-difluorophenyl)isopropoxyborate (5.85 g, 10.6 mmol) was dissolved in ether (150 mL) and chlorotrimethylsilane (3.00 mL, 23.6 mmol) was added to the solution at ambient temperature. Precipitate began to form within 15 minutes. The reaction mixture was allowed to stir over the weekend. By Monday, the volatiles had evaporated away (non-sealed container). The colorless solid was extracted with ether and filtered. The volatiles were removed under reduced pressure to give the product as a colorless solid, 4.98 g. NMR spectra showed clean borane, but with only about 86% of the required ether for a mono etherate complex. The product was dissolved in ether to give a hazy solution. THF (6 mL) was added and the solution became crystal clear. The volatiles were removed under reduced pressure to give a glassy solid. The residue was extracted with benzene, filtered, and the volatiles were removed under reduced pressure to give a white solid. Yield: 4.63 g, 69.9%.

$^1$H NMR (400 MHz, Benzene-d$_6$) δ 8.02 (d, J=1.8 Hz, 2H), 7.77 (dq, J=1.9, 0.9 Hz, 1H), 6.71-6.60 (m, OH), 6.48 (t, J=8.4 Hz, 1H), 3.17-3.09 (m, 2H), 0.77-0.68 (m, 2H). $^{13}$C NMR (101 MHz, Benzene-d$_6$) δ 164.82 (dd, J=243.3, 14.1 Hz), 147.95, 133.82, 133.30, 130.91 (d, J=32.4 Hz), 124.41 (q, J=272.8 Hz), 121.40 (q, J=3.9 Hz), 112.57-111.60 (m), 73.58, 24.03 (d, J=3.3 Hz). $^{19}$F NMR (376 MHz, Benzene-d$_6$) δ −62.80, −99.69 (t, J=7.5 Hz). $^{11}$B NMR (160 MHz, Benzene-d$_6$) δ 12.2 (s).

Catalyst Sample C5, bis(3,5-bis(trifluoromethyl)phenyl)(2,5-bis(trifluoromethyl)phenyl)borane, was prepared as follows:

Preparation of Lithium Isopropoxy bis(3,5-bis(trifluoromethyl)phenyl)(2,5-bis(trifluoromethyl)phenyl)borate

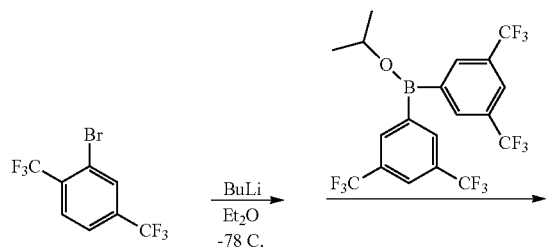

n-Butyllithium (4.00 mL, 2.535 M in hexanes, 10.14 mmol) was added slowly to a cold (−78° C., CO$_2$(s) bath) solution of 1-bromo-2,5-bis(trifluoromethyl)benzene (3.00 g, 10.24 mmol) in diethyl ether (200 mL). The reaction mixture was stirred for 1 hour at −78° C. Isopropoxy-bis(3,5-bis(trifluoromethyl)phenyl)borane (5.036 g, 10.15 mmol) in ether (18 mL) was added slowly. The reaction mixture was stirred for several hours at −78° C. The solution was warmed to ambient temperature while stirring overnight to give a pale-yellow clear solution. The volatiles were removed from the reaction mixture to give a yellow oil. The oil was extracted with benzene. There was nothing insoluble. The volatiles were removed from the reaction mixture to give a yellow oil. The yield was 7.88 g, 98.3%.

$^1$H NMR (400 MHz, Benzene-d$_6$) δ 8.06 (s, 1H), 8.00 (s, 4H), 7.70 (dt, J=1.8, 0.9 Hz, 2H), 7.40 (d, J=8.3 Hz, 1H), 7.19 (d, J=8.4 Hz, 1H), 3.79 (hept, J=6.1 Hz, 1H), 2.78 (q, J=7.1 Hz, 4H), 0.73 (d, J=6.1 Hz, 6H), 0.54 (t, J=7.1 Hz, 6H). $^{13}$C NMR (101 MHz, Benzene-d$_6$) δ 158.31, 153.97, 135.44 (q, J=3.7 Hz), 135.23, 133.55 (t, J=4.1 Hz), 133.25, 133.18, 132.37 (d, J=97.8 Hz), 130.92 (q, J=32.0 Hz), 127.80 (q, J=273.9 Hz), 124.92 (q, J=272.5 Hz), 124.66 (q, J=272.8 Hz), 123.86 (q, J=3.8 Hz), 119.86 (p, J=3.9 Hz), 66.24, 66.17, 25.60, 13.94. $^{19}$F NMR (376 MHz, Benzene-d$_6$) δ −55.30--55.51 (m), −62.82, −63.61. $^{11}$B NMR (160 MHz, Benzene-d$_6$) δ 2.16.

Preparation of bis(3,5-bis(trifluoromethyl)phenyl)(2,5-bis(trifluoromethyl)phenyl)borane

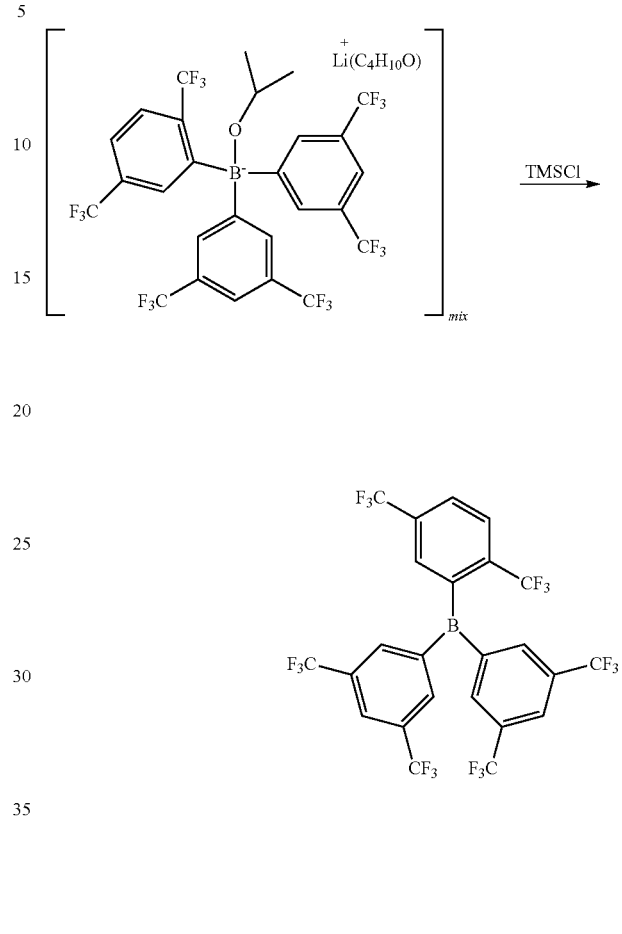

Lithium(diethyletherate) isopropoxy-bis(3,5-bis(trifluoromethypphenyl)(2,5-bis(trifluoromethyl)phenyl)borate (7.88 g, 9.97 mmol) was dissolved in ether (150 mL). Chlorotrimethylsilane (2.6 mL, 20.5 mmol) was added. The reaction mixture was allowed to stir overnight to give a yellow solution with colorless precipitate. The volatiles were removed under reduced pressure. The residue was extracted with hexane (100 ml). The mixture was filtered and the volatiles were concentrated under reduced pressure. The solution was cooled in the freezer (−33° C.) overnight. The reaction mixture was filtered and the precipitate was dried under reduced pressure to give a white powder. Yield: 6.0182 g, 92.84%.

THF-free compound: $^1$H NMR (400 MHz, Benzene-d$_6$) δ 7.87 (s, 2H), 7.85 (s, 4H), 7.29 (s, 1H), 7.11 (d, J=1.2 Hz, 2H). $^{13}$C NMR (126 MHz, Benzene-d$_6$) δ 140.87, 140.75, 137.49 (d, J=3.8 Hz), 135.11 (q, J=31.7 Hz), 133.26 (q, J=33.0 Hz), 132.03 (q, J=33.6 Hz), 128.29, 127.34 (q, J=3.8 Hz), 127.11 (q, J=4.0 Hz), 127.01 (q, J=4.0 Hz), 124.46 (q, J=274.3 Hz), 123.70 (q, J=273.2 Hz), 123.49 (q, J=272.9 Hz). $^{19}$F NMR (376 MHz, Benzene-d$_6$) δ −56.98, −63.43, −63.47. $^{11}$B NMR (160 MHz, Benzene-d$_6$) δ 64.37.

Catalyst Sample C6, (3,5-bis(trifluoromethyl)phenyl)bis(2,5-bis(trifluoromethyl)phenyl)borane, was prepared as follows:

Preparation of lithium diisopropoxy (3,5-bis(trifluoromethyl)phenyl)(2,5-bis(trifluoromethyl)phenyl)borate

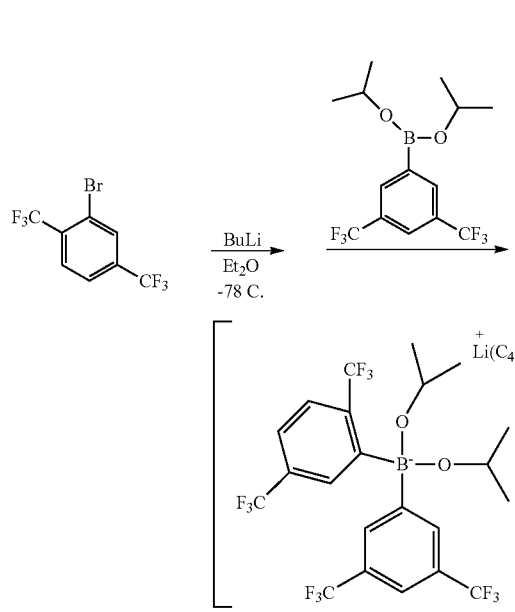

To a cold (between −101° C. and −99° C., CO$_2$(s), then N$_2$(l) methanol bath) solution of 1-bromo-2,5-bis(trifluoromethyl)benzene (3.000 g, 10.24 mmol) in diethyl ether (150 mL) was added n-butyllithium (4.00 mL, 2.535 M in hexanes, 10.14 mmol) with stirring. The reaction mixture was stirred for 2 hours at around −100° C. then was allowed to warm up to −78° C. Bis(isopropoxy)(3,5-bis(trifluoromethyl)phenyl)borane (3.510 g, 10.26 mmol) in ether (10 mL) was added slowly. The reaction mixture was allowed to warm to ambient temperature while stirring overnight. The volatiles were removed from the pale-yellow nearly clear solution under reduced pressure to give a crystalline-appearing solid. The solid was dissolved in ether (10 mL) and placed in the freezer. Nothing precipitated. The ether was evaporated and the yellow solid was dissolved in hexane, filtered, and concentrated under a nitrogen stream to give crystalline solid. The supernatant was removed and the solid was dried under reduced pressure. Yield of colorless crystals from the first crop: 3.318 g. NMR analysis of the crystals showed pure desired compound. The supernatant was placed in the freezer overnight. Crystalline matter formed. The supernatant was pipetted out and discarded. The crystalline residue was dried under reduced pressure: 2.017 g. Total yield: 5.335 g, 82.79%.

$^1$H NMR (400 MHz, Benzene-d$_6$) δ 8.39 (s, 2H), 8.26 (s, 1H), 7.90 (dq, J=1.8, 0.9 Hz, 1H), 7.56 (d, J=8.2 Hz, 1H), 7.27 (ddt, J=7.9, 1.7, 0.8 Hz, 1H), 3.18 (hept, J=6.0 Hz, 2H), 2.92 (q, J=7.1 Hz, 4H), 0.89 (t, J=7.1 Hz, 6H), 0.78 (d, J=6.1 Hz, 6H), 0.68 (d, J=6.0 Hz, 6H). $^{13}$C NMR (101 MHz, Benzene-d$_6$) δ 153.10, 136.65 (q, J=29.6 Hz), 134.81 (dd, J=2.7Hz, 1.9 Hz), 133.93 (q, J=3.6 Hz), 131.93 (q, J=31.6 Hz), 131.35, 129.76 (q, J=31.9 Hz), 127.26 (q, J=274.6 Hz), 125.17 (d, J=272.4 Hz), 124.89 (q, J=272.8 Hz), 123.25 (q, J=3.9 Hz), 119.89 (p, J=3.9 Hz), 66.42, 64.08, 25.49, 24.57, 14.36. $^{19}$F NMR (376 MHz, Benzene-d$_6$) δ −55.79, −62.66, −63.30. $^{11}$B NMR (160 MHz, Benzene-d$_6$) δ 5.32.

Preparation of isopropoxy (3,5-bis(trifluoromethyl)phenyl)(2,5-bis(trifluoromethyl)phenyl)borane

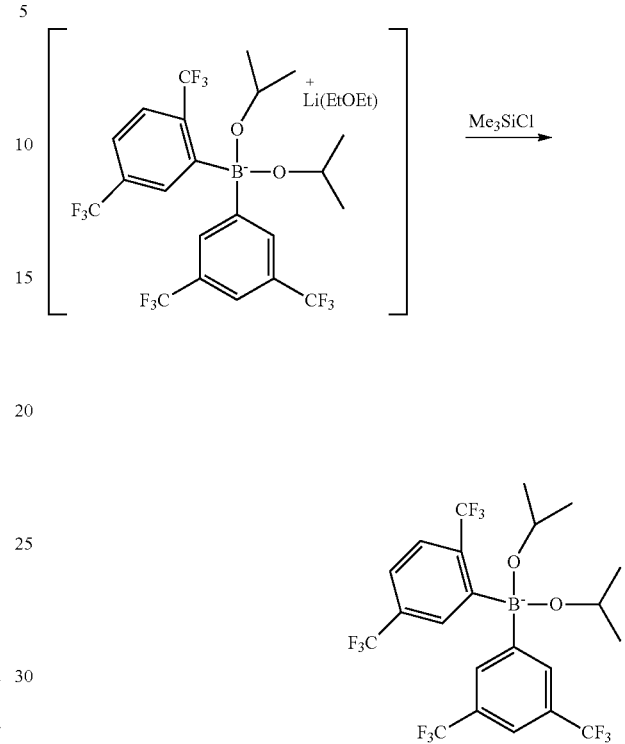

To a solution of lithium(diethyletherate) diisopropoxy-(3,5-bis(trifluoromethyppheny1)(2,5-bis(trifluoromethyl)phenyl)borate (3.318 g, 5.21 mmol) in ether (10 mL) was added chlorotrimethylsilane (2.0 mL) with rapid formation of precipitate. The reaction mixture was allowed to stir overnight. The reaction mixture was filtered and the volatiles were removed under reduced pressure. NMR analysis showed the reaction was complete. Some putative TMS-O-iPr ether was present, too. The second crop of lithium diisopropoxy (3,5-bis(trifluoromethyl)phenyl)(2,5-bis(trifluoromethyl)phenyl)borate prepared as described above was treated similarly (2.017 g, 3.17 mmol, of lithium salt; 2.0 mL of TMSCl) and stirred for 3 hours. The total amount of combined reagents: 5.335 g, 8.39 mmol; TMSCl: 4.0 mL, 31.6 mmol. The second reaction mixture was filtered and combined with the first reaction product. The volatiles were removed under reduced pressure. The residue was extracted with hexane, filtered, and the volatiles were removed overnight at 40° C. under reduced pressure to give the product as a yellow oil, 3.4703 g, 83.42%.

$^1$H NMR (400 MHz, Benzene-d$_6$) δ 8.05 (d, J=1.8 Hz, 2H), 7.80 (d, J=2.3 Hz, 1H), 7.34 (d, J=1.9 Hz, 1H), 7.12 (d, J=6.5 Hz, 1H), 7.10 (d, J=6.7 Hz, 1H), 3.78 (hept, J=6.1 Hz, 1H), 0.85 (d, J=6.1 Hz, 6H). $^{13}$C NMR (101 MHz, Benzene-d$_6$) δ 139.07, 136.28, 135.37 (q, J=31.8 Hz), 134.93 (d, J=3.9 Hz), 133.49 (q, J=32.7 Hz), 131.50 (q, J=33.0 Hz), 127.87, 126.95 (dq, J=7.5, 3.7 Hz), 126.46 (q, J=3.7 Hz), 125.41 (hex, J=3.8 Hz), 124.57 (q, J=273.9 Hz), 123.98 (q, J=272.8 Hz), 123.90 (q, J=273.0 Hz), 72.49, 23.71. $^{19}$F NMR (376 MHz, Benzene-d$_6$) δ −60.31, −63.27 (d, J=3.3 Hz), −63.47 (d, J=3.3 Hz). $^{11}$B NMR (160 MHz, Benzene-d$_6$) δ 41.28.

Preparation of lithium isopropoxy bis(2,5-bis(trifluoromethyl)phenyl)(3,5-bis(trifluoromethyl)phenyl)borate

Preparation of bis(2,5-bis(trifluoromethyl)phenyl)(3,5-bis(trifluoromethyl)phenyl)borane

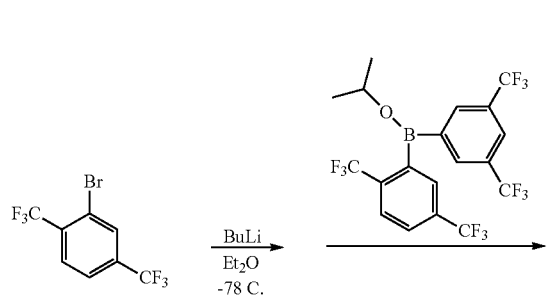

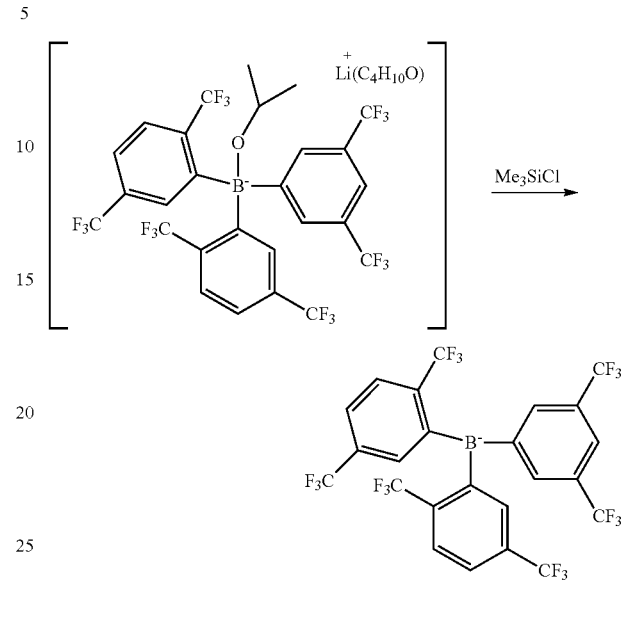

To a solution of lithium(diethyletherate) isopropoxy-bis(2,5-bis(trifluoromethyl)phenyl)(3,5-bis(trifluoromethyl)phenyl)borate (3.915 g, 4.95 mmol) in diethyl ether (150 mL) was added chlorotrimethylsilane (1.10 mL, 10.1 mmol) with stirring. Within 15 minutes, precipitate formed in solution. The reaction mixture was stirred overnight. The mixture was filtered and the volatiles were removed under reduced pressure to give a colorless solid, 3.260 g. The product was extracted with hexane, filtered, and the volatiles were removed under reduced pressure to give the product as a pale solid, 3.109 g, 96.53%.

n-Butyllithium (2.40 mL, 2.535 M in hexanes, 6.08 mmol) was added slowly to a cold (−78° C., CO$_2$(s) bath) solution of 1-bromo-2,5-bis(trifluoromethyl)benzene (1.800 g, 6.14 mmol) in diethyl ether (150 mL). The reaction mixture was stirred for 1 hour at −78° C. Isopropoxy(2,5-bis(trifluoromethypphenyl)(3,5-bis(trifluoromethypphenyeborane (3.022 g, 6.09 mmol) in ether (18 mL) was added slowly. The reaction mixture was stirred for several hours at −78° C. The solution was allowed to warm to ambient temperature while stirring overnight to give a pale-yellow clear solution. The volatiles were removed from the reaction mixture to give a yellow oil. The oil was extracted with benzene. There was nothing insoluble. The volatiles were removed from the reaction mixture to give a yellow oil. The yield was 4.21 g, 87.6%.

$^1$H NMR (400 MHz, Benzene-d$_6$) δ 8.30 (s, 2H), 8.12 (s, 2H), 7.65 (dt, J=1.7, 0.9 Hz, 1H), 7.27 (d, J=8.2 Hz, 2H), 7.08 (d, J=8.2 Hz, 2H), 3.87 (hept, J=6.2 Hz, 1H), 2.91 (q, J=7.1 Hz, 4H), 0.65 (d, J=6.2 Hz, 6H), 0.63 (t, J=7.1 Hz, 6H). $^{13}$C NMR (101 MHz, Benzene-d$_6$) δ 157.17, 156.73, 134.42, 133.88 (q, J=3.6 Hz), 133.04 (d, J=28.4 Hz), 132.88 (q, J=32.1 Hz), 129.95 (q, J=31.9 Hz), 127.74 (q, J=273.6 Hz), 127.33 (q, J=6.9 Hz), 124.97 (q, J=272.4 Hz), 124.50 (q, J=273.0 Hz), 122.72 (q, J=3.8 Hz), 118.78 (p, J=4.1 Hz), 65.88, 65.34, 25.11, 13.91. $^{19}$F NMR (376 MHz, Benzene-d$_6$) δ −56.31, −62.89, −63.76. $^{11}$B NMR (160 MHz, Benzene-d$_6$) δ 2.98.

$^1$H NMR (500 MHz, Benzene-d$_6$) δ 7.90 (s, 1H), 7.83 (s, 1H), 7.66 (s, 3H), 7.09 (s, 5H), 7.09 (s, 5H). $^{13}$C NMR (126 MHz, Benzene-d$_6$) δ 141.54, 140.05, 138.35 (q, J=3.8 Hz), 135.84 (q, J=32.0 Hz), 133.02 (q, J=33.0 Hz), 132.02 (q, J=33.7 Hz), 129.98 (q, J=3.5 Hz), 128.29, 127.91 (d, J=2.4 Hz), 127.13 (q, J=4.2 Hz), 124.15 (q, J=274.2 Hz), 123.70 (q, J=273.2 Hz), 123.37 (q, J=273.2 Hz). $^{19}$F NMR (470 MHz, Benzene-d$_6$) δ −56.40, −63.31, −63.58. $^{11}$B NMR (160 MHz, Benzene-d$_6$) δ 67.58.

Catalyst Sample C7 was prepared as follows:

Preparation of tris(2,5-bis(trifluoromethyl)phenyl)borane

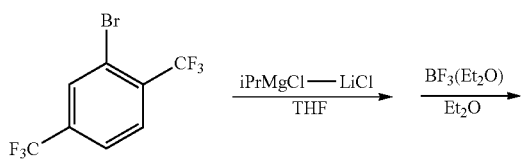

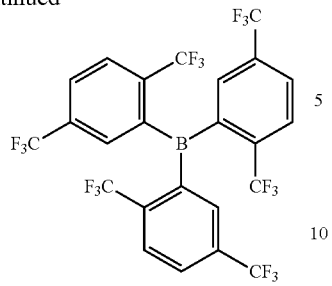

This reaction was carried out in a manner similar to a previously reported procedure.[2] Isopropylmagnesium chloride-lithium chloride (46.0 mL, 58.0 mmol, 1.26 M solution in THF) was added to a solution of 1-bromo-2,5-bis(trifluoromethyl)benzene (17.05 g, 58.2 mmol) in THF (250 mL) which was in an acetone bath cooled with dry ice (−76° C.). After the addition was complete, the reaction flask was transferred to an ice bath (0° C.) and the reaction mixture was stirred for 2 hours. The reaction mixture was cooled to −78° C. and boron trifluoride diethyletherate (2.43 mL, 2.74 g, 19.3 mmol) in 15 mL of ether was added. The reaction mixture was allowed to warm to room temperature while it was stirred over the weekend. The volatiles were removed from the solution to give a reddish solid, 12.77 g. The residue was extracted with toluene and filtered. The volatiles were removed under reduced pressure to give a pink powder, 10.75 g. The solids were extracted with methylene chloride to give a light violet solution. The solution was placed overnight in the freezer. The supernatant was decanted from the very light pinkish crystalline material which formed. The material was dried overnight under reduced pressure. Yield: 7.0003 g, 55.73%.

[2] Herrington, T. J.; Thom, A. J. W.; White, A. J. P.; Ashley, A. E. *Dalton Trans.* 2012, 41, 9019.

TH-free product: $^1$H NMR (400 MHz, Benzene-$d_6$) δ 7.57 (s, 1H), 7.13 (s, 3H), 7.08 (dd, J=8.3, 1.8 Hz, 3H). $^{13}$C NMR (101 MHz, Benzene-$d_6$) δ 141.10, 136.50 (q, J=32.2 Hz), 132.81 (q, J=33.1 Hz), 131.59 (q, J=3.8 Hz), 128.85 (q, J=3.7 Hz), 127.45 (q, J=3.4, 2.1 Hz), 123.93 (q, J=274.6 Hz), 123.59 (q, J=273.1 Hz). $^{19}$F NMR (376 MHz, Benzene-$d_6$) δ −56.48, −63.77. $^{11}$B NMR (160 MHz, Benzene-$d_6$) δ 68.81.

Catalyst sample C8, bis(3,5-bis(trifluoromethyl)phenyl) (2,3,5,6-tetrafluoro-4-trifluoromethylphenyl)borane THF adduct, was prepared as follows:

Preparation of lithium(tetrahydrofuranate) bis(3,5-bis(trifluoromethyl)phenyl)(2,3,5,6-tetrafluoro-4-trifluoromethylphenyl)isopropoxyborate

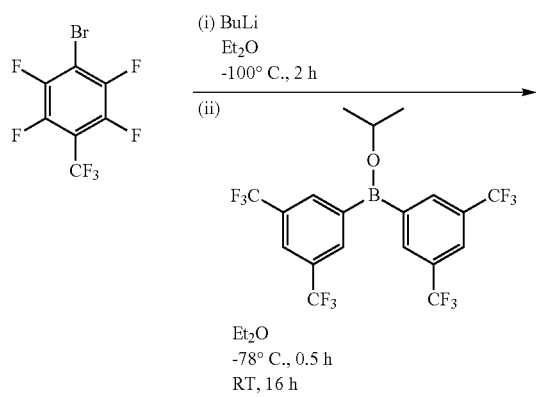

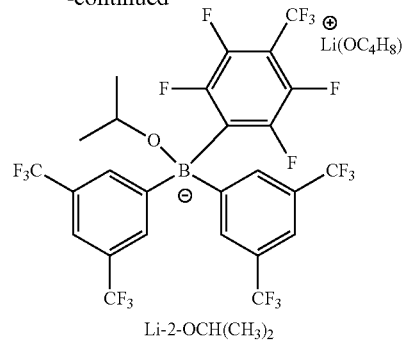

n-Butyllithium (3.00 mL, 2.54 M in hexanes, 7.61 mmol) was added to a cold (between −101° C. and −99° C., CO$_2$(s), then N$_2$(l) methanol bath) solution of 1-bromo-2,3,5,6-tetrafluoro-4-trifluoromethylbenzene (2.26 g, 7.61 mmol) in diethyl ether (100 mL) with stirring. The reaction mixture was stirred for 2 hours at −100° C. then was allowed to warm up to −76° C. Bis(3,5-bis(trifluoromethyl)phenyl)isopropoxy-borane (3.78 g, 7.61 mmol) in ether (10 mL) was added slowly to the reaction mixture. The reaction mixture was allowed to warm slowly to ambient temperature while stirring overnight. The next day, the pale-yellow, nearly clear solution was filtered and the volatiles were removed from the filtrate under reduced pressure to give a crystalline-appearing solid. The solid was washed with hexane, filtered, and dried under reduced pressure. An aliquot of the solid was removed for NMR analysis. It had limited solubility in benzene. The aliquot was dissolved in THF and the volatiles were removed under reduced pressure and then analyzed again by NMR in benzene. Yield: 6.16 g, 93.2%.

$^1$H NMR (500 MHz, Benzene-$d_6$) δ 8.32 (s, 4H), 7.85 (s, 2H), 3.47 (h, J=6.2 Hz, 1H), 3.26-3.17 (m, 4H), 1.24-1.16 (m, 4H), 0.55 (d, J=6.2 Hz, 6H). $^{13}$C NMR (126 MHz, Benzene-$d_6$) δ 144.07 (d, J=259.4 Hz), 134.41, 133.82, 133.48 (d, J=187.5 Hz), 130.59 (q, J=32.2 Hz), 130.45 (q, J=31.8 Hz), 126.40-123.43 (m), 125.84, 124.97 (q, J=272.4 Hz), 119.94 (p, J=4.0 Hz), 118.92 (d, J=190.9 Hz), 109.57 (d, J=22.7 Hz), 68.38, 65.30, 25.64, 25.13. $^{19}$F NMR (470 MHz, Benzene-$d_6$) δ −56.26 (t, J=20.7 Hz), −62.59, −137.04, −141.73. $^{11}$B NMR (160 MHz, Benzene-$d_6$) δ 1.20.

Preparation of bis(3,5-bis(trifluoromethyl)phenyl)(2,3,5,6-tetrafluoro-4-trifluoromethylphenyl)borane tetrahydrofuranate, THF Adduct

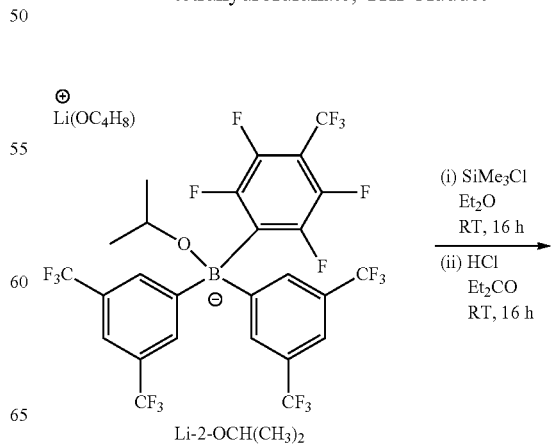

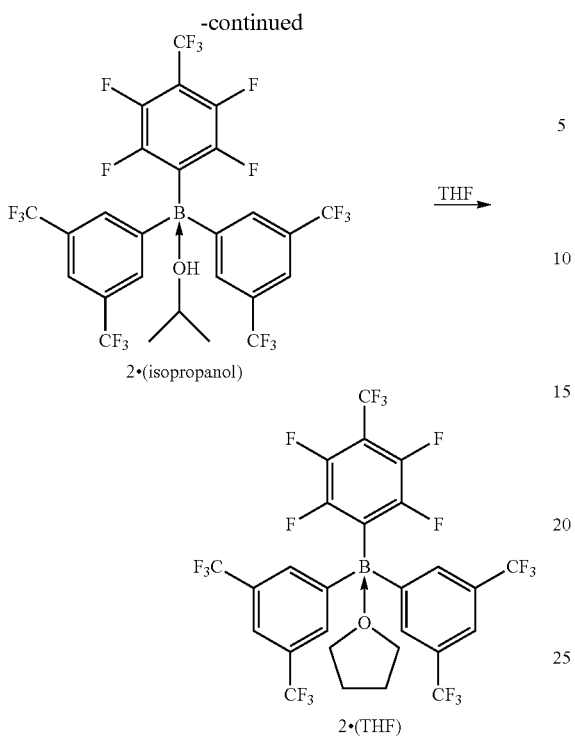

2·(isopropanol)

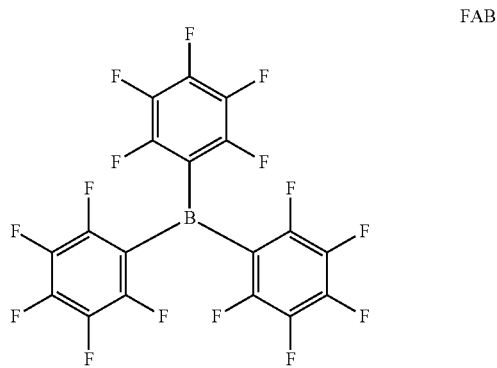

2·(THF)

To a solution of lithium(tetrahydrofuranate) bis(3,5-bis(trifluoromethyl)phenyl)(2,3,5,6-tetrafluoro-4-(trifluoromethyl)phenyl)isopropoxyborate (6.16 g, 7.10 mmol) in diethyl ether (100 mL) was added chlorotrimethylsilane (2.00 mL, 18.4 mmol) with stirring. The reaction mixture was stirred overnight. The next day, analysis of an aliquot of the reaction mixture by $^{19}$F NMR spectroscopy revealed that no reaction had occurred. Hydrogen chloride solution in ether (7.00 mL, 2.0 M, 14.0 mmol) was added and the reaction mixture was stirred overnight. The next day, analysis of an aliquot of the reaction mixture by $^{19}$F NMR spectroscopy revealed that the reaction was complete. The mixture was filtered and the volatiles were removed from the filtrate under reduced pressure. The resultant residue was dissolved in toluene, filtered, and the volatiles were removed from the filtrate under reduced pressure to give 4.50 g of crude product. The colorless, pasty solid was washed with hexane and filtered to give a colorless powder, which was dried under reduced pressure. NMR analysis of the powder revealed that one molecule of isopropanol remained in the coordination sphere of the borane. Yield of the borane as a isopropanol adduct: 2.45 g, 52.8%.

A portion of the borane isopropanol adduct (1.811 g) was dissolved in ether (40 mL) and THF (10 mL) was added to the solution. The solution was allowed to evaporate slowly to give large crystals. The supernatant was removed, and the very pale, yellow crystals were washed with hexane. The crystals were dried under reduced pressure (1.08 g). The crystals were analyzed by X-ray crystallography and found to be the borane isopropanol adduct. The THF had not displaced the coordinated alcohol. The supernatant solution from the crystals and the hexane washings were combined and concentrated under vacuum to give a second crop of crystals (0.422 g). The second crop of crystals was washed and dried in the same manner as the first crop. NMR analysis showed the presence of coordinated isopropanol, but little or no THF. THF was added and then the volatiles were removed under reduced pressure. NMR analysis showed the presence of THF, but still some isopropanol. The solid was dissolved in THF and then pumped off. This was repeated five more times to give the THF adduct of the product as a white powder. Yield: 0.413 g, 22.4%.

THF Adduct:

$^1$H NMR (400 MHz, Benzene-d$_6$) δ 7.87 (s, 4H), 7.80 (s, 4H), 3.02-2.93 (m, 4H), 0.78-0.72 (m, 4H). $^{13}$C NMR (126 MHz, Benzene-d$_6$) δ 147.98 (td, J=16.5, 3.6 Hz), 146.05 (tt, J=11.8, 4.1 Hz), 145.58 (d, J=20.9 Hz), 143.50 (d, J=20.1 Hz), 133.44, 131.39 (q, J=32.6 Hz), 124.24 (q, J=272.7 Hz), 121.78 (t, J=4.0 Hz), 121.45 (q, J=274.4 Hz), 109.38-108.10 (m), 73.75, 23.90. $^{19}$F NMR (376 MHz, Benzene-d$_6$) δ −56.57 (t, J=21.0 Hz), −62.95, −130.60 (dd, J=22.5, 13.2 Hz), −140.71 (qt, J=19.7, 8.6 Hz). $^{11}$B NMR (160 MHz, Benzene-d$_6$) δ 7.22. The catalyst samples prepared as described above in Reference Example 2 are shown below.

FAB

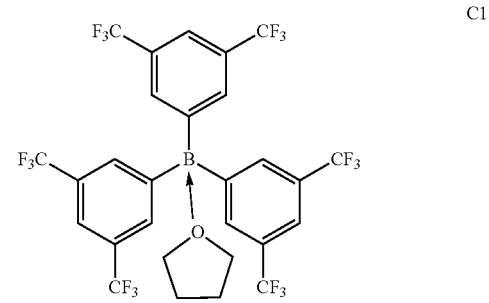

C1

C2

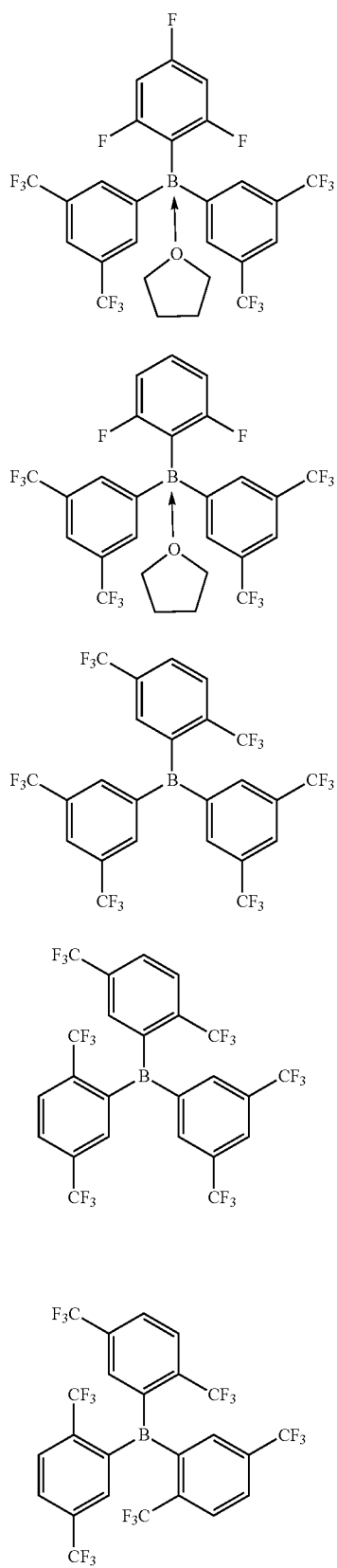

Structures of fluorinated arylborane Lewis acid catalyst samples C1 to C8, and commercially available FAB, are shown above. Structure C1 is tris(3,5-bis(trifluoromethyl)phenyl)borane THF adduct (corresponding to starting material A1) in the claims). Structure C2 is bis(3,5-bis(trifluoromethyl)phenyl)(4-trifluoromethylphenyl)borane THF adduct corresponding to starting material A2) in the claims). Structure C3 is bis(3,5-bis(trifluoromethyl)phenyl)(2,4,6-trifluorophenyl)borane THF adduct (corresponding to starting material A3) in the claims). Structure C4 is bis(3,5-bis(trifluoromethyl)phenyl)(2,6-difluorophenyl)borane THF adduct (corresponding to starting material A4) in the claims). Structure C5 is bis(3,5-bis(trifluoromethyl)phenyl)(2,5-bis(trifluoromethyl)phenyl)borane (corresponding to starting material A5) in the claims). Structure C6 is (3,5-bis(trifluoromethyl)phenyl)bis(2,5-bis(trifluoromethyl)phenyl)borane (corresponding to starting material A6) in the claims). Structure C7 is tris(2,5-bis(trifluoromethyl)phenyl)borane. Structure C8 is bis(3,5-bis(trifluoromethyl)phenyl)(2,3,5,6-tetrafluoro-4-trifluoromethylphenyl)borane THF adduct (corresponding to starting material A7) in the claims).

REFERENCE EXAMPLE 3—GENERAL PROCEDURE

HTMS, PMDS, TES, TMSOMe, and FAB (described above in Table 1) were used as received. In a nitrogen-purged glove-box, solutions of fluorinated triarylborane Lewis acid samples (catalysts) were prepared in 10-mL glass vials (ex. FAB, 30.7 mg, 0.06 mmol was dissolved in 5 mL of anhydrous deuterated benzene). In an NMR tube was placed the silyl hydride (ex: HTMS, 32.6 µL, 0.12 mmol, 1 equiv.), the organosilicon compound with an alkoxy group (ex: trimethylmethoxysilane, 17 µL, 0.12 mmol, 1 equiv.), an internal standard (mesitylene, 16.8 µL, 0.12 mmol, 1 equiv.). The catalyst (0.5 mL, 0.006 mmol, 5 mol %) was delivered as a stock solution via pipet. The final concentration of the solution is 0.24M. The tube was capped and $^1$H NMR spectra were taken at regular time intervals. Conversion was established in comparison to the internal standard using a 400 MHz NMR.

All fluorinated triarylborane Lewis acid samples tested, except C7, catalyzed the SiH—SiOR cure reaction under the conditions tested. Without wishing to be bound by theory, it is thought that C7 was too sterically bulky to catalyze this reaction under these conditions, and that this further demonstrates that not all fluorinated aryl boranes will catalyze the reaction.

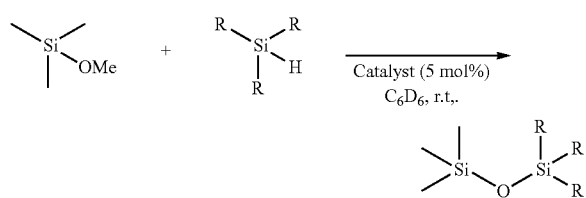

Reaction Scheme with various silyl hydrides and fluorinated triarylboranes.

TABLE 1

Results of Reactions at RT

| Fluorinated Triarylborane | Silane | | | | | |
|---|---|---|---|---|---|---|
| | HTMS Conversion (%) | | PMDS Conversion (%) | | TES Conversion (%) | |
| Sample | 2 h | 24 h | 2 h | 24 h | 2 h | 24 h |
| FAB | 100 | 100 | 100 | 100 | 100 | 100 |
| C1 | 93 | 98 | 86 | 89 | 59 | 74 |
| C2 | 50 | 67 | 98 | 95 | 40 | 43 |
| C3 | 76 | 97 | 90 | 95 | 44 | 79 |
| C4 | 63 | 91 | 89 | 91 | 38 | 64 |
| C5 | 44 | 65 | 91 | 93 | 44 | 48 |
| C6 | 0 | 0 | 30 | 35 | 0 | 0 |
| C7 | 0 | 0 | 0 | 0 | 0 | 0 |
| C8 | 100 | 100 | 91 | 91 | 95 | 100 |

Without wishing to be bound by theory, it is thought that TES is more difficult to react than HMTS, which is more difficult to react than PMDS, and C6 would yield higher conversions at higher temperatures.

INDUSTRIAL APPLICABILITY

The composition and method described herein employ fluorinated triarylborane Lewis acids as catalysts. These fluorinated triarylborane Lewis acids provide better reaction rate control than FAB. The composition and method described herein provide the further benefit that order of addition of the starting materials is not critical; the starting materials can be combined in any order. The present composition and method may provide the benefits of pot-life and/or process robustness. Without wishing to be bound by theory, it is thought that a silyl hydride should not be mixed with FAB, as that would trigger self-cure.

Definitions and Usage of Terms

Abbreviations used in the specification have the definitions in Table 5, below.

TABLE 5

Abbreviations

| Abbreviation | Definition |
|---|---|
| ° C. | Degrees Celsius |
| FTIR | Fourier Transform Infrared |
| g | Grams |
| GPC | gel permeation chromatography |
| iPr | isopropyl |
| Me | Methyl |
| mL | Milliliters |
| mmol | Millimoles |

TABLE 5-continued

Abbreviations

| Abbreviation | Definition |
|---|---|
| Mn | number average molecular weight as measured by GPC as described in Reference Example 2 |
| Mp | Peak molecular weight as measured by GPC as described in Reference Example 2 |
| Mw | weight average molecular weight |
| NMR | nuclear magnetic resonance |
| PDI | Polydispersity index |
| Ph | phenyl |
| ppm | parts per million |
| PTFE | polytetrafluoroethylene |
| RH | relative humidity |
| RT | room temperature of 25° C. ± 5° C. |
| s | seconds |
| SiH content | hydrogen, as silicon-bonded hydrogen, as measured by $^{29}$Si NMR |
| THF | tetrahydrofuran |
| μL | microliter |
| μmol | Micromole |
| Vi | Vinyl |

All amounts, ratios, and percentages are by weight unless otherwise indicated. The amounts of all starting materials in a composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

The term "comprising" and derivatives thereof, such as "comprise" and "comprises" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims.

The invention claimed is:
1. A composition comprising:
  A) a fluorinated triarylborane Lewis acid selected from the group consisting of:
    A1) tris(3,5-bis(trifluoromethyl)phenyl)boran THF adduct;
    A2) bis(3,5-bis(trifluoromethyl)phenyl)(4-trifluoromethylphenyl)borane THF adduct;
    A3) bis(3,5-bis(trifluoromethyl)phenyl)(2,4,6-trifluorophenyl)borane THF adduct;
    A4) bis(3,5-bis(trifluoromethyl)phenyl)(2,6-difluorophenyl)borane THF adduct;
    A5) bis(3,5-bis(trifluoromethyl)phenyl)(2,5-bis(trifluoromethyl)phenyl)borane;
    A6) (3,5-bis(trifluoromethyl)phenyl)bis(2,5-bis(trifluoromethyl)phenyl)borane;
    A7) bis(3,5-bis(trifluoromethyl)phenyl)(2,3,5,6-tetrafluoro-4-trifluoromethylphenyl)borane THF adduct; and
    A8) a combination of two or more of A1) to A7);
  B) a hydrocarbonoxy-functional organosilicon compound having an average, per molecule of at least 1 silicon-bonded group of the formula —$OR^2$, wherein each $R^2$ is an independently selected monovalent hydrocarbon group of 1 to 6 carbon atoms; and
  C) a silyl hydride having at least 1 silicon-bonded hydrogen atom per molecule.

2. The composition of claim 1, where starting material A) is selected from the group consisting of:
  A1) tris(3,5-bis(trifluoromethyl)phenyl)borane THF adduct;
  A2) bis(3,5-bis(trifluoromethyl)phenyl)(4-trifluoromethylphenyl)borane THF adduct;
  A3) bis(3,5-bis(trifluoromethyl)phenyl)(2,4,6-trifluorophenyl)borane THF adduct;
  A4) bis(3,5-bis(trifluoromethyl)phenyl)(2,6-difluorophenyl)borane THF adduct;
  A5) bis(3,5-bis(trifluoromethyl)phenyl)(2,5-bis(trifluoromethyl)phenyl)borane; and
  A7) bis(3,5-bis(trifluoromethyl)phenyl)(2,3,5,6-tetrafluoro-4-trifluoromethylphenyl)borane THF adduct.

3. The composition of claim 2, where starting material A) is selected from the group consisting of: A1), A2), A3), A4), and A5).

4. The composition of claim 1, where starting material A) is present in an amount of 0.1 ppm to 5 mol %, based on combined weights of B) the hydrocarbonoxy-functional organosilicon compound and C) the silyl hydride.

5. The composition of claim 4, where starting material A) is present in an amount of 5 ppm to 6,000 ppm based on combined weights of B) the hydrocarbonoxy-functional organosilicon compound and C) the silyl hydride.

6. The composition of claim 1, where B) the organosilicon compound is selected from the group consisting of:
  B1) an alkoxysilane of formula: $R^1_{(4-a)}SiOR^2_a$, where each $R^1$ is independently selected from the group consisting of a monovalent hydrocarbon group and a monovalent halogenated hydrocarbon group, each $R^2$ is a monovalent hydrocarbon group of 1 to 6 carbon atoms, and subscript a is 1 to 4; and
  B2) an organosiloxane oligomer or polymer comprising a group of formula B2):

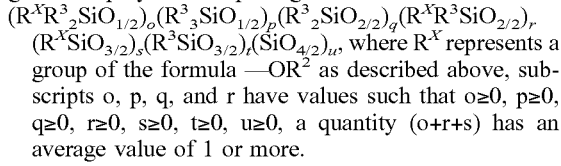

where each D independently represents an oxygen atom, a divalent hydrocarbon group, a divalent siloxane group, or a combination of a divalent hydrocarbon group and a divalent siloxane group; each $R^X$ independently represents a group of the formula —$OR^2$, wherein each $R^2$ is as described above; each $R^3$ is independently selected from the group consisting of a monovalent hydrocarbon group and a monovalent halogenated hydrocarbon group; subscript c represents 0, 1, 2, or 3; subscript e represents 0, 1, or 2; and subscript d has a value of 0 or greater, with the proviso that the sum of (e+c) is at least 1, such that, on average, at least one $R^X$ is present in the formula.

7. The composition of claim 6, where the organosiloxane oligomer or polymer comprising unit formula:
$(R^X R^3_2 SiO_{1/2})_o (R^3_3 SiO_{1/2})_p (R^3_2 SiO_{2/2})_q (R^X R^3 SiO_{2/2})_r$ $(R^X SiO_{3/2})_s (R^3 SiO_{3/2})_t (SiO_{4/2})_u$, where $R^X$ represents a group of the formula —$OR^2$ as described above, subscripts o, p, q, and r have values such that o≥0, p≥0, q≥0, r≥0, s≥0, t≥0, u≥0, a quantity (o+r+s) has an average value of 1 or more.

8. The composition of claim 1, where C) the silyl hydride is selected from the group consisting of:
  C1) a silane of formula $H_k SiR^5_{(4-k)}$, where each $R^5$ is independently selected from the group consisting of a monovalent hydrocarbon group and a monovalent halogenated hydrocarbon group, and subscript k is 1 to 3; and
  C2) an organohydrogensiloxane of unit formula: $(HR^4_2 SiO_{1/2})_g (R^4_3 SiO_{1/2})_h (R^4_2 SiO_{2/2})_i (HR^4 SiO_{2/2})_j$, where each $R^4$ is an independently selected monovalent hydrocarbon group, which is free of aliphatic unsaturation; subscripts g, h, i, and j have values such that g≥0, h≥0, a quantity (g+h) has an average value of 2, i≥0, j≥0, and a quantity (g+j)≥1, and a quantity (i+j) ranges from 0 to 1000.

9. The composition of claim 8, where starting material C) is a silane of formula $HSiR^5_3$, where each $R^5$ is an alkyl group of 1 to 6 carbon atoms.

10. The composition of claim 8, where starting material C) is a polydiorganohydrogensiloxane of formula

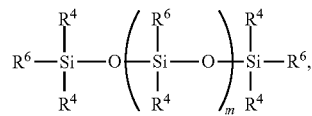

where subscript m is 0 or 1, each $R^4$ is an alkyl group, and each $R^6$ is independently selected from the group consisting of H and $R^4$, with the proviso that at least one $R^6$ is a hydrogen atom.

11. A method comprising:
  1) combining starting materials comprising:
  selected from the group consisting of:
    A1) tris(3,5-bis(trifluoromethyl)phenyl)borane THF adduct;
    A2) bis(3,5-bis(trifluoromethyl)phenyl)(4-trifluoromethylphenyl)borane THF adduct;
    A3) bis(3,5-bis(trifluoromethyl)phenyl)(2,4,6-trifluorophenyl)borane THF adduct;

A4) bis(3,5-bis(trifluoromethyl)phenyl)(2,6-difluorophenyl)borane THF adduct;
A5) bis(3,5-bis(trifluoromethyl)phenyl)(2,5-bis(trifluoromethyl)phenyl)borane;
A6) (3,5-bis(trifluoromethyl)phenyl)bis(2,5-bis(trifluoromethyl)phenyl)borane;
A7) bid(3,5-bis(trifluoromethyl)phenyl)(2,3,5,6-tetrafluoro-4-trifluoromethylphenyl)borane THF adduct; and
A8) a combination of two or more of A1) to A7);
B) a hydrocarbonoxy-functional organosilicon compound having an average, per molecule of at least 1 silicon-bonded group of the formula —OR$^2$, wherein each R$^2$ is an independently selected monovalent hydrocarbon group of 1 to 6 carbon atoms; and
C) a silyl hydride having at least 1 silicon-bonded hydrogen atom per molecule; thereby forming a product of step 1) comprising a reaction product of starting materials B) and C) and a side product comprising HR$^2$.

12. The method of claim 11, where the method is performed at a temperature of 5° C. to 70° C.

13. The method of claim 11, further comprising: neutralizing residual fluorinated triarylborane Lewis acid in the product of step 1).

14. The method of claim 11, further comprising: during and/or after step 1), removing the side product comprising HR$^2$.

15. The method of claim 11, further comprising: recovering the reaction product.

16. The method of claim 11, wherein starting material B) comprises tirmethylmethoxysilane.

17. The method of claim 11, wherein starting material C) is selected from the group consisting of heptamethyltrisiloxane, pentamethyldisiloxane, and triethylsilane.

18. The composition of claim 9, where the silane is triethylsilane.

19. The composition of claim 10, where the polydiorganohydrogensiloxane is selected from the group consisting of heptamethyltrisiloxane and pentamethyldisiloxane.

20. The composition of claim 6, where the alkoxysilane is trimethylmethoxysilane.

* * * * *